(12) United States Patent
Kim et al.

(10) Patent No.: US 11,129,067 B2
(45) Date of Patent: Sep. 21, 2021

(54) METHOD AND APPARATUS FOR SUPPORTING HANDOVER OF DRONE IN WIRELESS COMMUNICATION SYSTEM

(71) Applicant: LG ELECTRONICS INC., Seoul (KR)

(72) Inventors: Sanggook Kim, San Diego, CA (US); Ki-Dong Lee, San Diego, CA (US)

(73) Assignee: LG Electronics Inc., Seoul (KR)

( * ) Notice: Subject to any disclaimer, the term of this patent is extended or adjusted under 35 U.S.C. 154(b) by 90 days.

(21) Appl. No.: 16/315,396

(22) PCT Filed: Jul. 6, 2017

(86) PCT No.: PCT/KR2017/007259
§ 371 (c)(1),
(2) Date: Jan. 4, 2019

(87) PCT Pub. No.: WO2018/009011
PCT Pub. Date: Jan. 11, 2018

(65) Prior Publication Data
US 2019/0306768 A1    Oct. 3, 2019

Related U.S. Application Data

(60) Provisional application No. 62/359,169, filed on Jul. 6, 2016.

(51) Int. Cl.
*H04W 36/00* (2009.01)
*H04B 17/327* (2015.01)
(Continued)

(52) U.S. Cl.
CPC .... *H04W 36/00835* (2018.08); *H04B 17/327* (2015.01); *H04B 17/382* (2015.01);
(Continued)

(58) Field of Classification Search
CPC ........... H04W 36/00835; H04W 76/27; H04W 36/0016; H04W 36/0044; H04W 36/08;
(Continued)

(56) References Cited

U.S. PATENT DOCUMENTS 9,537,561 B1 *   1/2017   Kotecha ................. H04W 8/00
2016/0107749 A1   4/2016   Mucci
(Continued)

FOREIGN PATENT DOCUMENTS

| EP | 1469697 | 5/2015 |
|----|---------|--------|
| EP | 3029996 | 6/2016 |
| KR | 1020160074895 | 6/2016 |

*Primary Examiner* — Jackie Zuniga Abad
(74) *Attorney, Agent, or Firm* — Dentons US LLP

(57) ABSTRACT

Disclosed is a method for supporting the handover of a drone in a wireless communication system. The method is performed by the drone and includes measuring signal quality of one or more neighboring eNBs using one or more reference signals (RSs) transmitted by the one or more neighboring eNBs; configuring a candidate set comprising at least one candidate eNB related to the handover based on the measured signal quality, wherein a signal quality value measured with respect to the at least one candidate eNB is greater than a predetermined threshold; comparing the signal quality value of the at least one candidate eNB with a signal quality value of a serving eNB; and transmitting a first message to request the handover to the serving eNB if the signal quality value of the at least one candidate eNB is better than the signal quality value of the serving eNB for a specific period.

8 Claims, 12 Drawing Sheets

(51) Int. Cl.
*H04B 17/382* (2015.01)
*H04W 76/27* (2018.01)
*H04W 36/08* (2009.01)
*H04W 36/30* (2009.01)
*H04W 84/06* (2009.01)

(52) U.S. Cl.
CPC ... *H04W 36/0016* (2013.01); *H04W 36/0044* (2013.01); *H04W 36/08* (2013.01); *H04W 36/30* (2013.01); *H04W 76/27* (2018.02); *H04W 36/0079* (2018.08); *H04W 84/06* (2013.01)

(58) Field of Classification Search
CPC .... H04W 36/30; H04W 84/06; H04B 17/327; H04B 17/382
See application file for complete search history.

(56) References Cited

U.S. PATENT DOCUMENTS

2016/0161258 A1* 6/2016 Magson ............... G05D 1/0022
 701/467
2018/0287696 A1* 10/2018 Barbieri ............... H04W 36/22

* cited by examiner

[Figure 1]
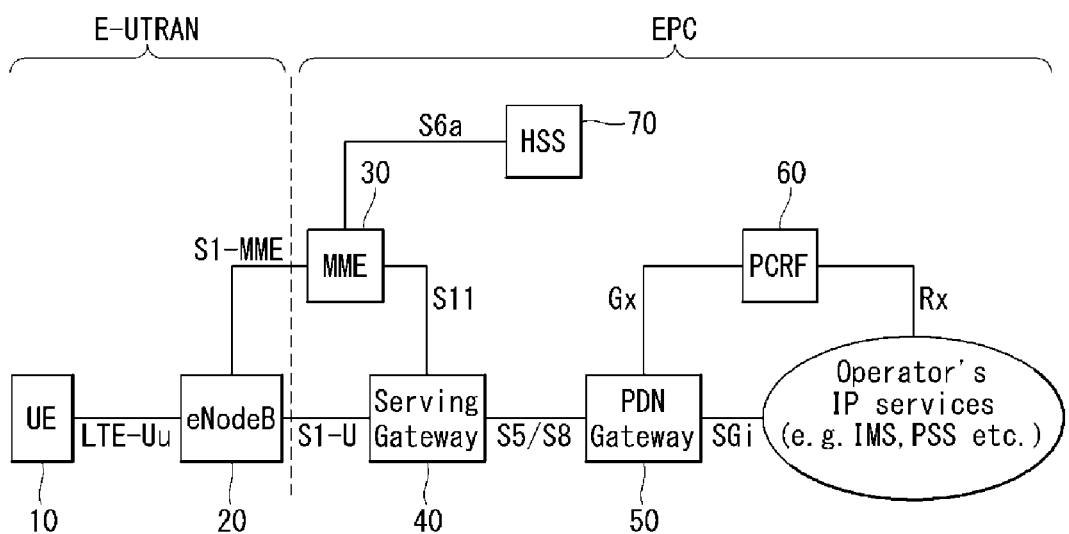

[Figure 2]
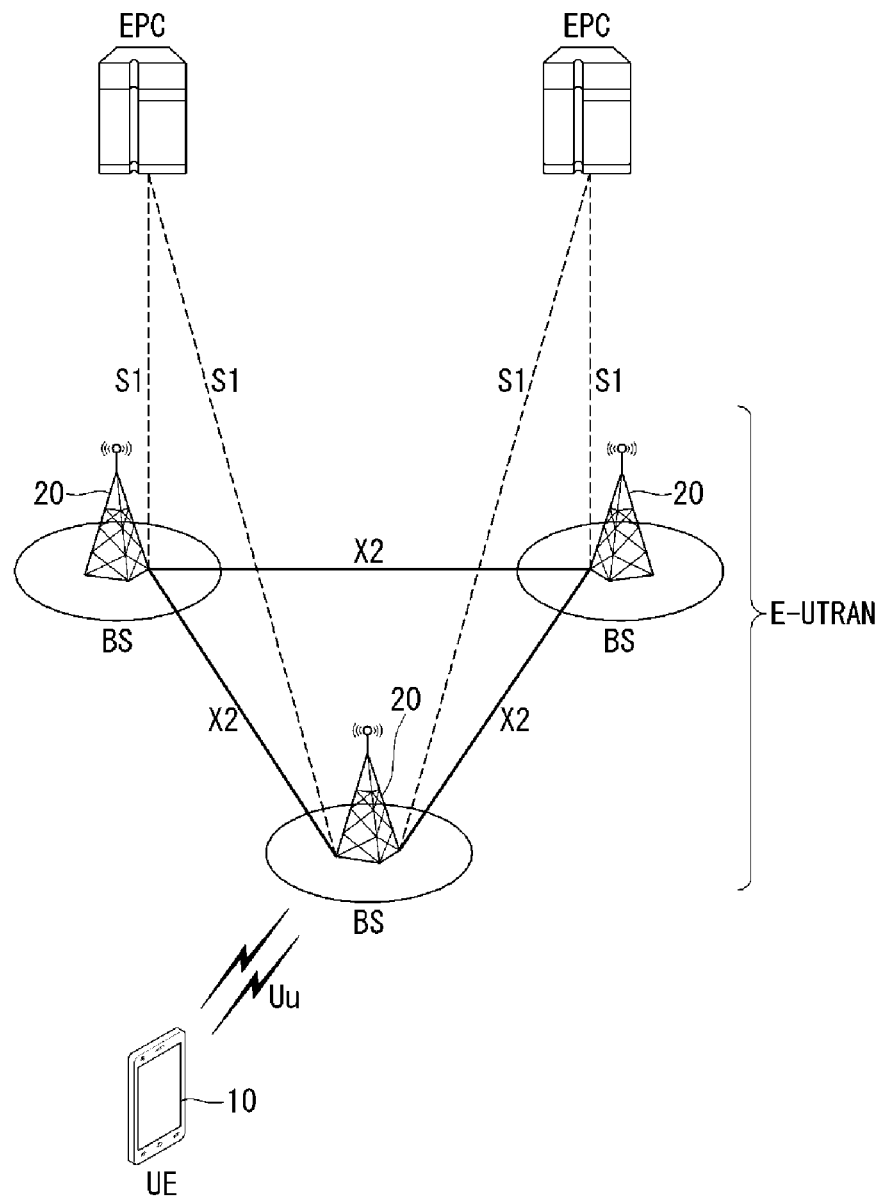

[Figure 3]
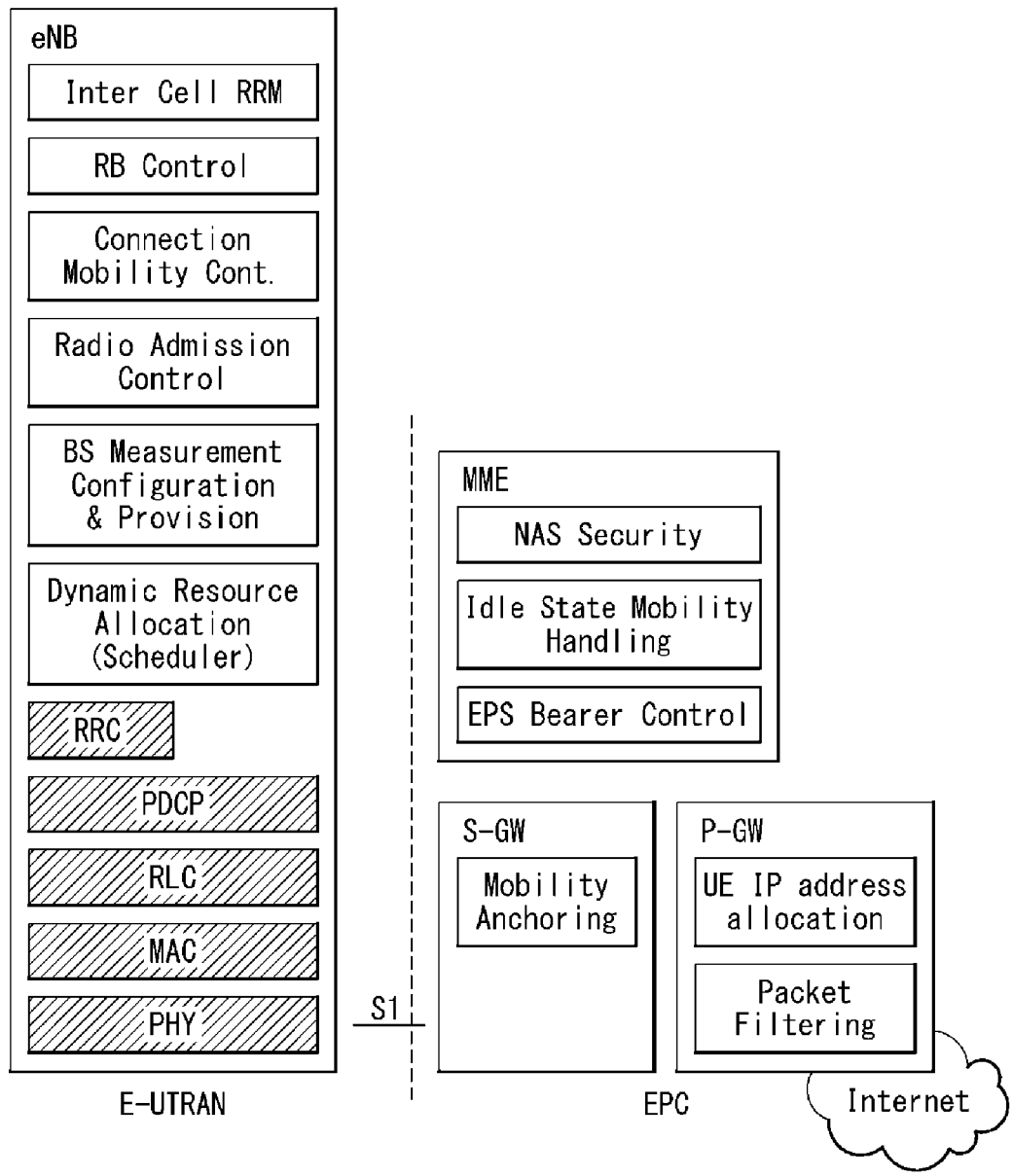

[Figure 4]
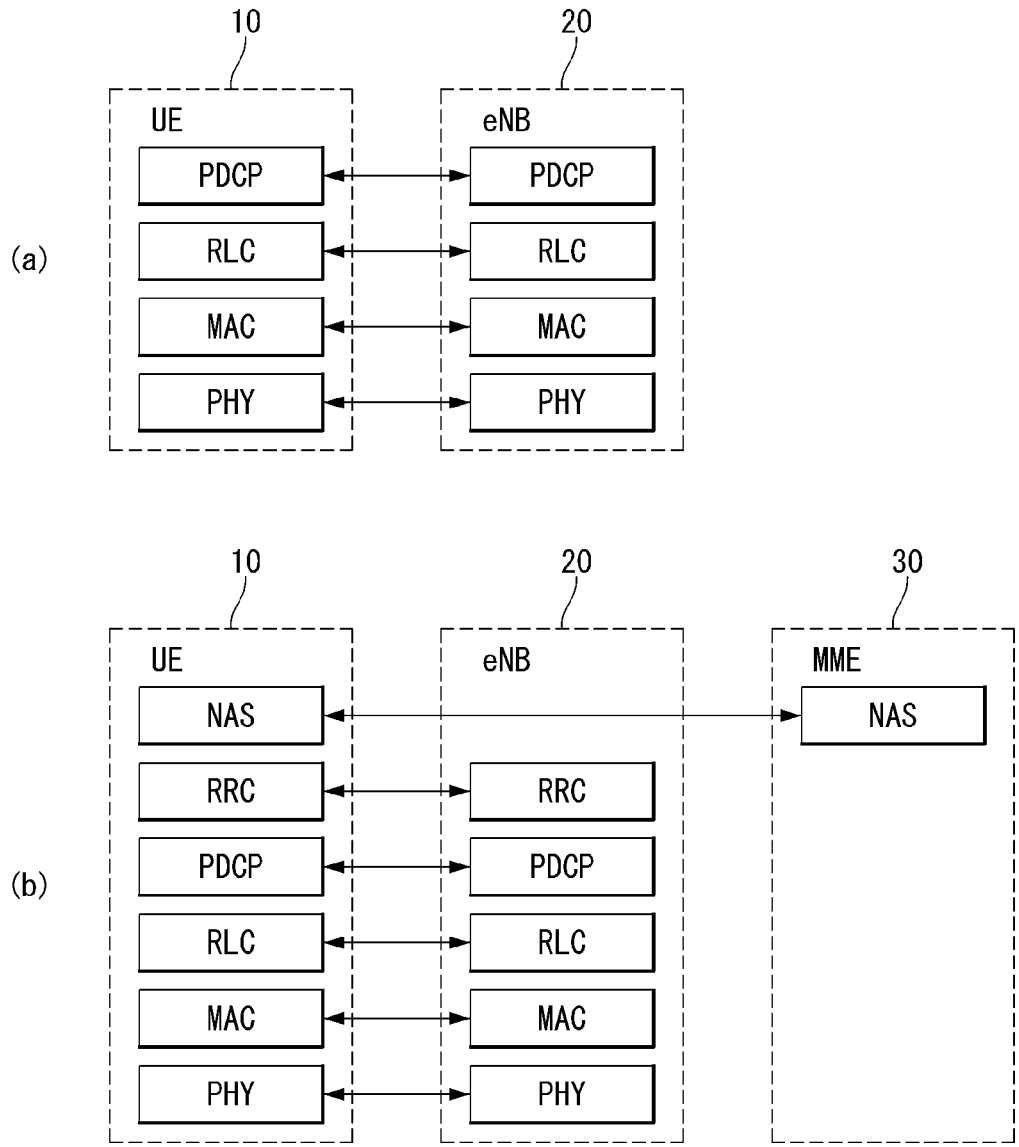

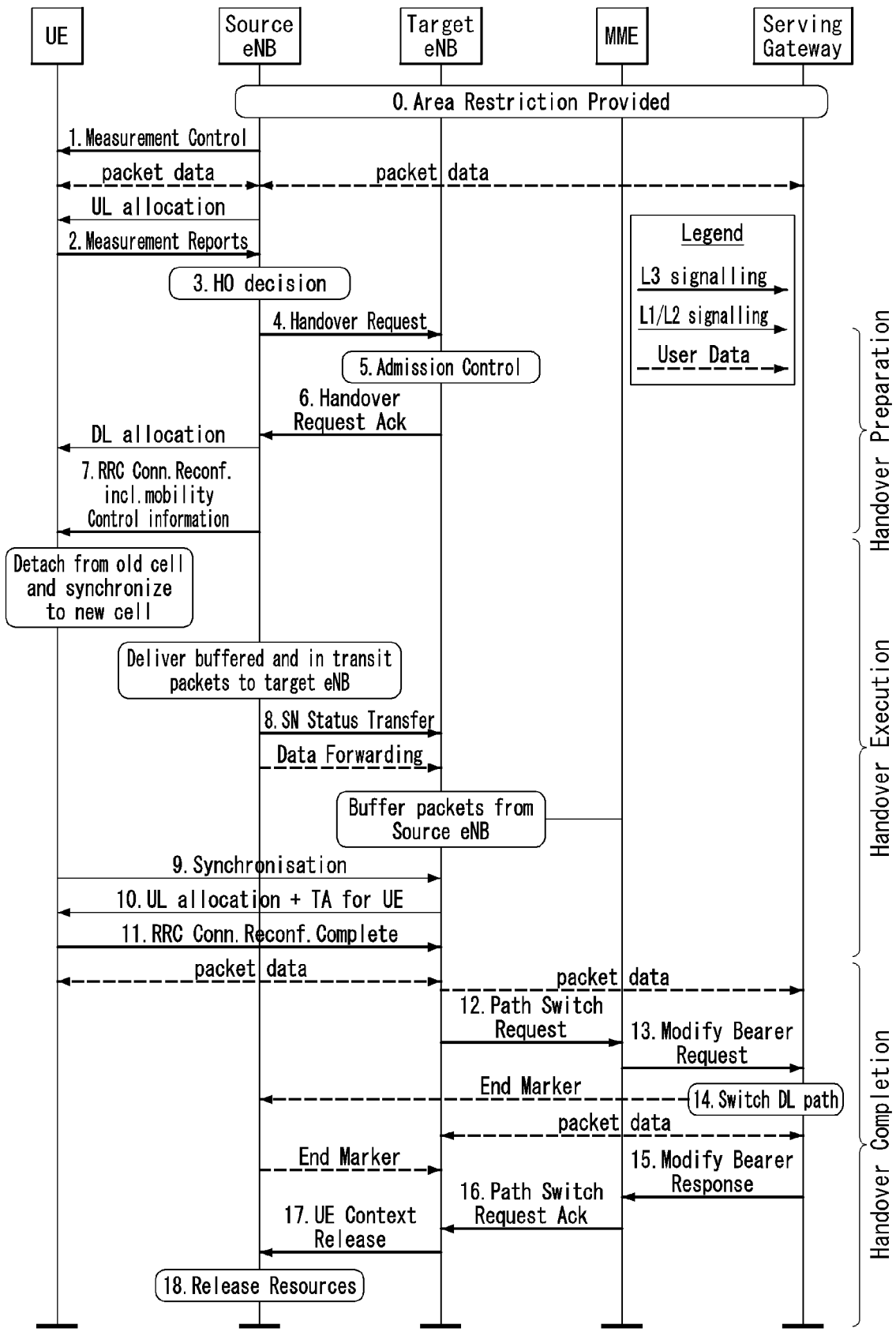

[Figure 6]
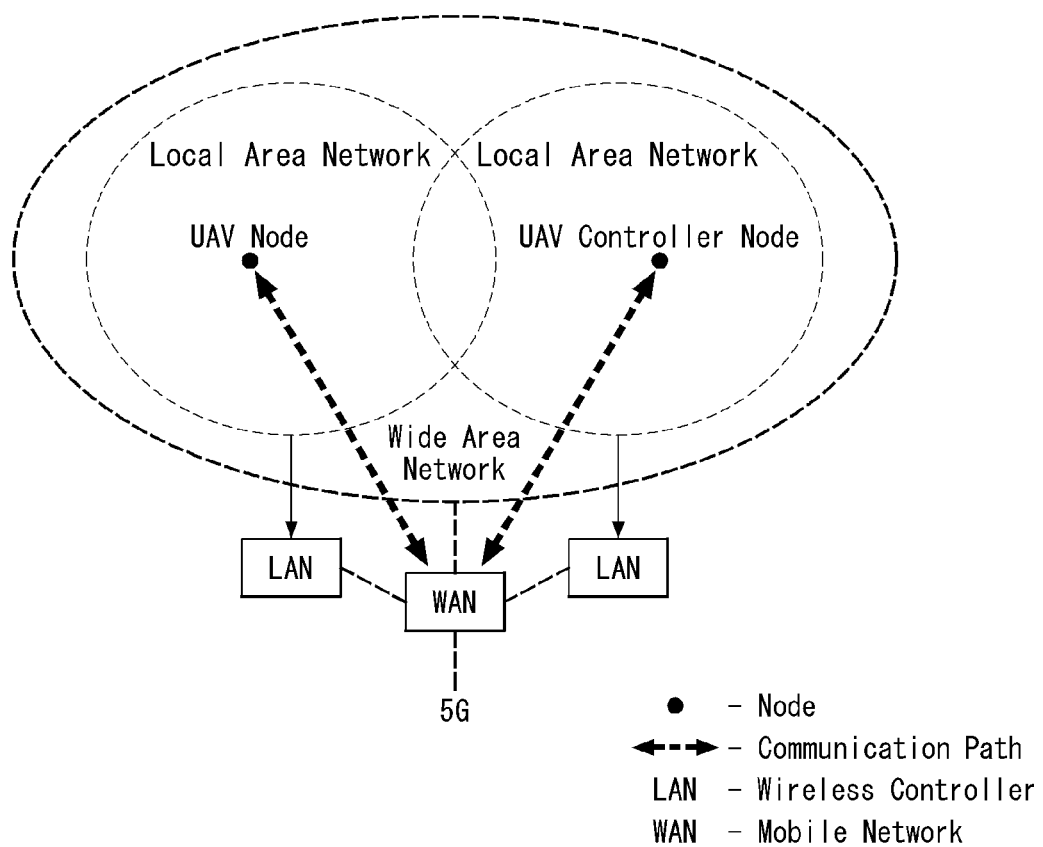

[Figure 7]
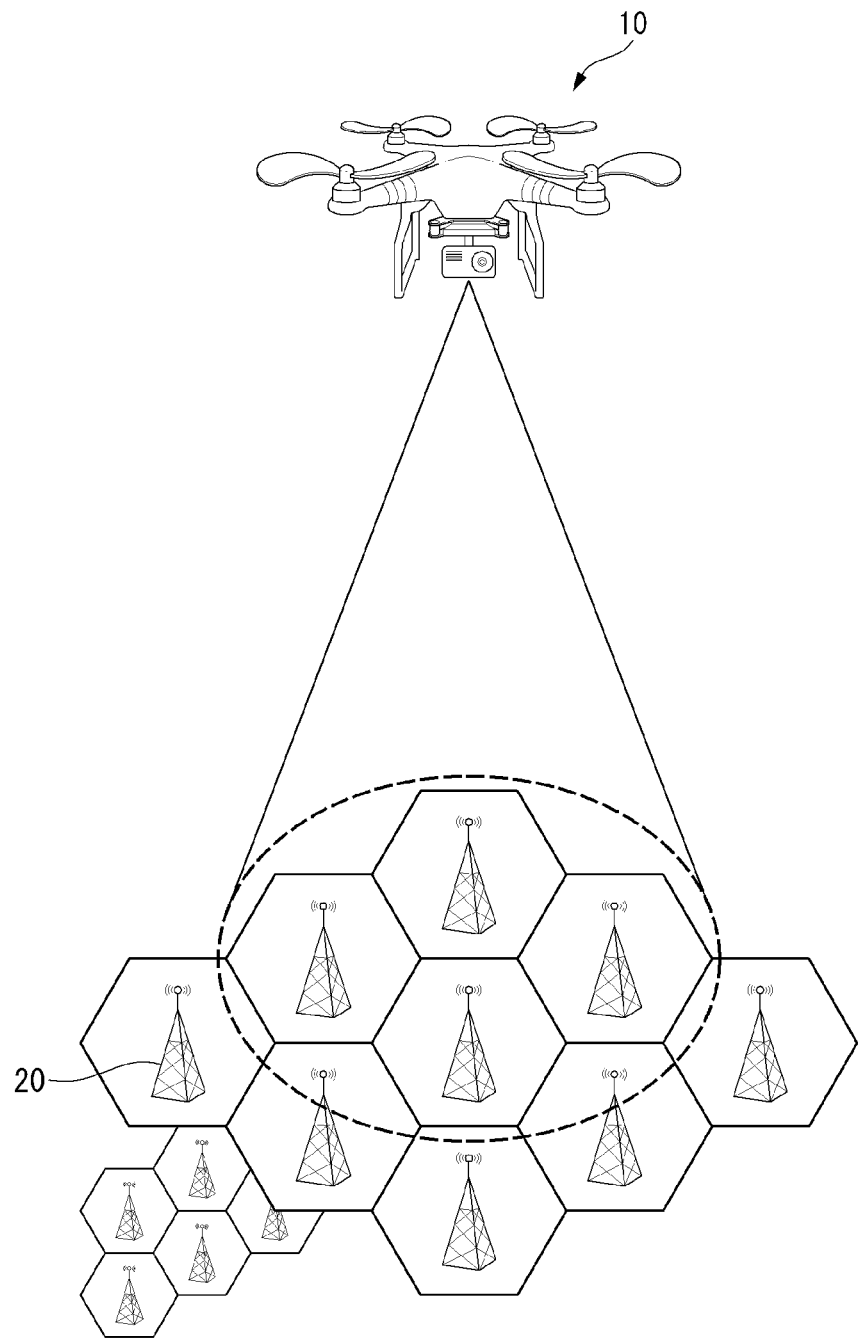

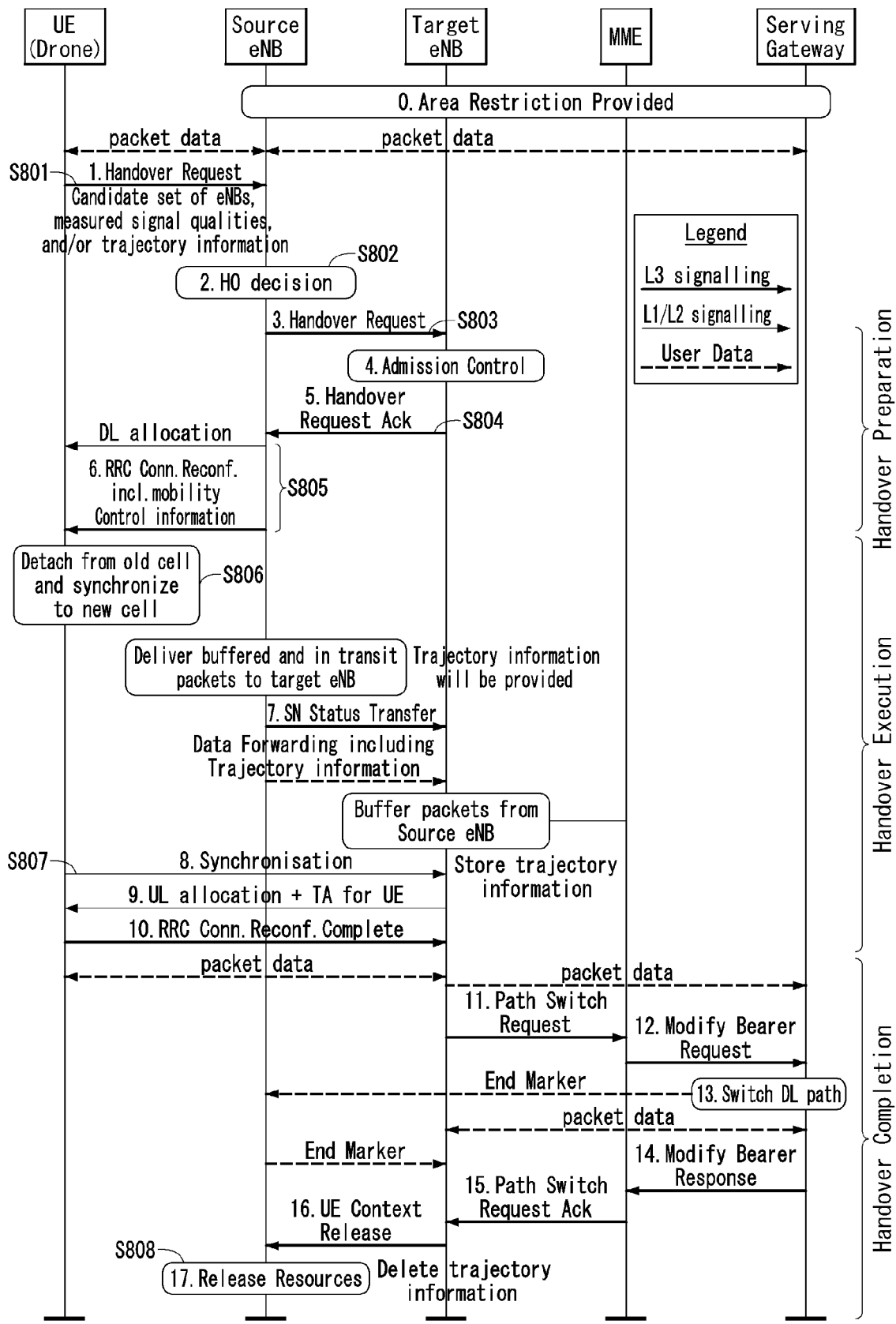

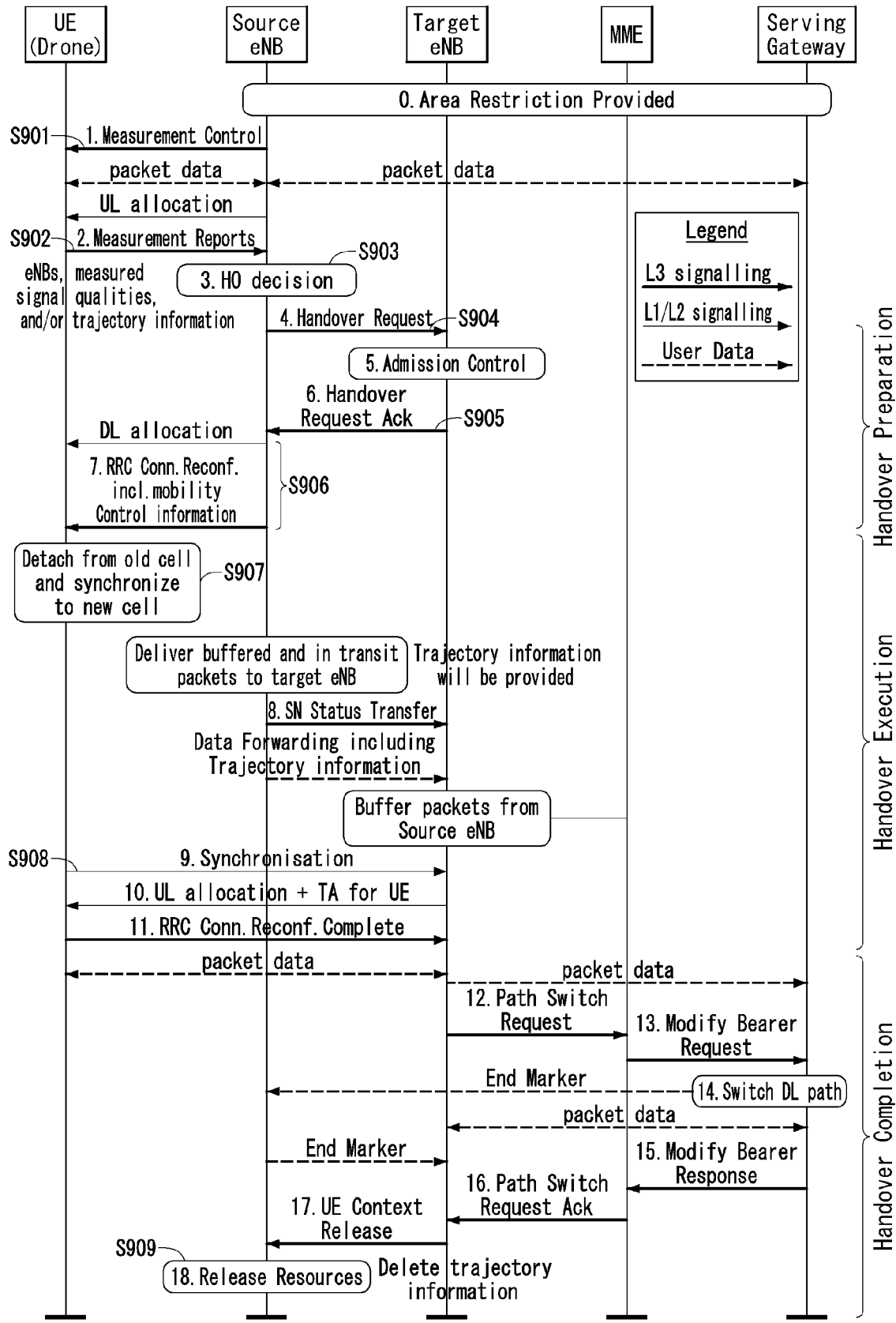
[Figure 9]

[Figure 10]
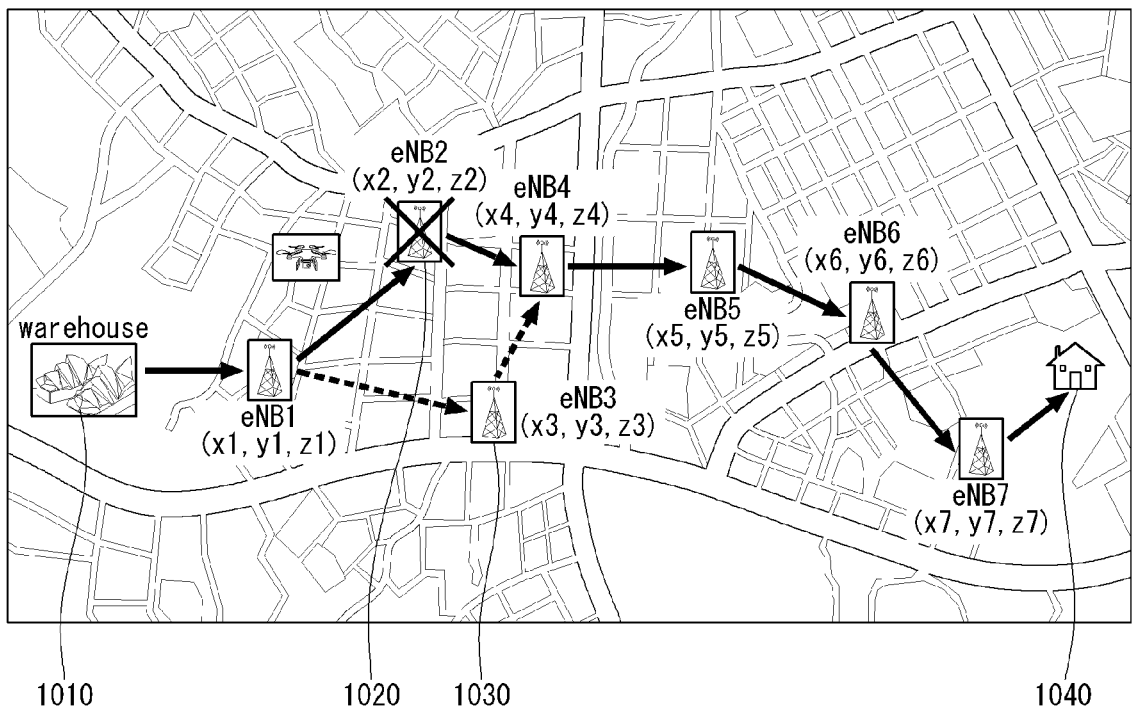
[Figure 11]
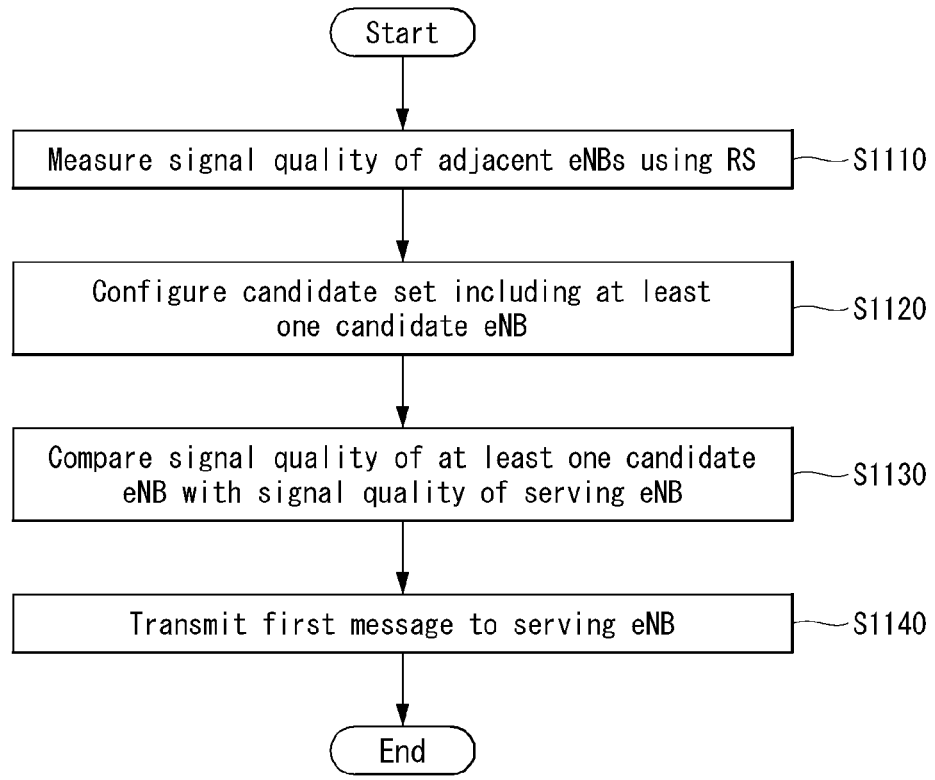

[Figure 12]
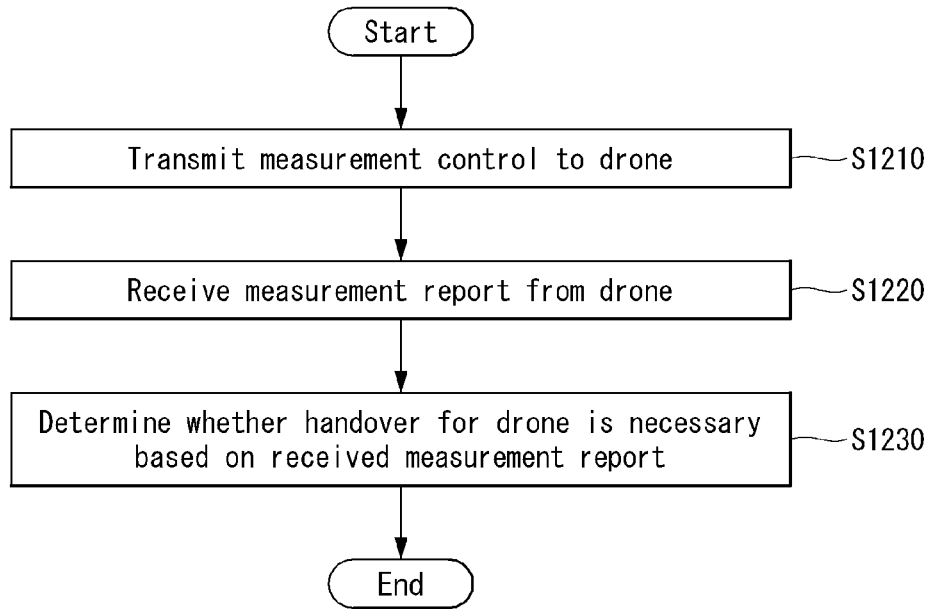
[Figure 13]
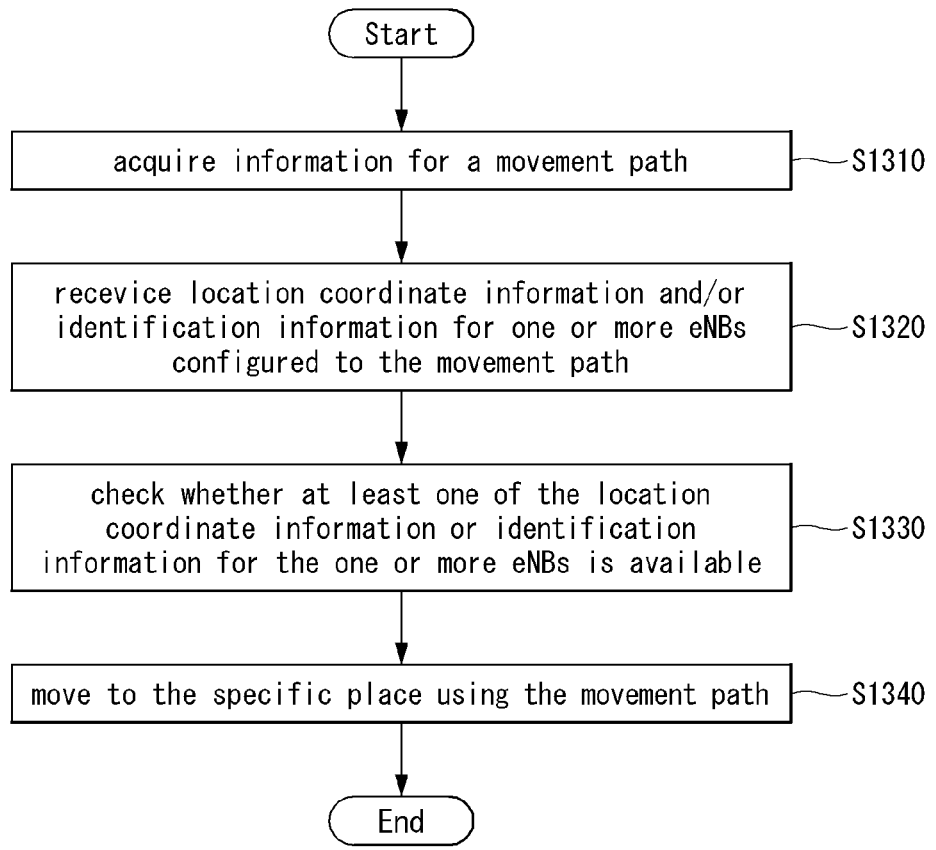

[Figure 14]
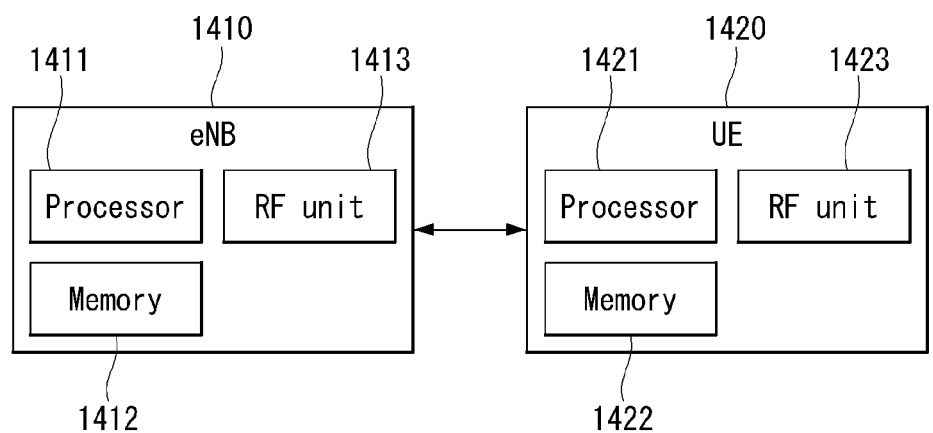

METHOD AND APPARATUS FOR SUPPORTING HANDOVER OF DRONE IN WIRELESS COMMUNICATION SYSTEM

CROSS-REFERENCE TO RELATED APPLICATIONS

This application is the National Stage filing under 35 U.S.C. 371 of International Application No. PCT/KR2017/007259, filed on Jul. 6, 2017, which claims the benefit of U.S. Provisional Application No. 62/359,169 filed on Jul. 6, 2016, the contents of which are all hereby incorporated by reference herein in their entirety.

TECHNICAL FIELD

This specification relates to a method and apparatus for supporting handover of a drone in a wireless communication.

BACKGROUND ART

Mobile communication systems have been developed to provide voice services while assuring users' activities. However, the mobile communication systems have been expanding their areas up to data services as well as voice services, and a current explosive growth of traffic caused a lack of resources, so that users require further advanced mobile communication systems offering quicker services.

As requirements for next-generation mobile communication systems, covering drastically increasing data traffic, a significant increase in transmission rate per user, much more linked devices, very low end-to-end latency, and high energy efficiency should be supported. To this end, various techniques are under research, such as small cell enhancement, dual connectivity, massive MIMO (Multiple Input Multiple Output), in-band full duplex, NOMA (non-orthogonal multiple access), super wideband support, or device networking.

DISCLOSURE

Technical Problem

An object of this specification is to provide a method for efficiently supporting the handover of a drone using trajectory information for the drone in cellular-based drone communication.

More specifically, an object of this specification is to provide a handover method initiated by a drone and a handover method initiated by a serving eNB.

Objects to be achieved in this specification are not limited to the aforementioned advantages, and those skilled in the art to which the present invention pertains may evidently understand other objects from the following description.

Technical Solution

This specification provides a method for supporting the handover of a drone in a wireless communication system. The method is performed by the drone, and includes measuring signal quality of one or more adjacent eNBs using reference signals (RSs) transmitted by the adjacent eNBs, configuring a candidate set including at least one candidate eNB related to handover based on the measured signal quality, wherein a signal quality value measured with respect to the at least one candidate eNB is greater than a predetermined threshold, comparing the signal quality of the at least one candidate eNB with signal quality of a serving eNB, and if, as a result of the comparison, the signal quality of the at least one candidate eNB is found to be better than the signal quality of the serving eNB for a specific period, transmitting a first message to request handover to the serving eNB. The first message includes at least one of information about the identification (ID) of the at least one candidate eNB, signal quality information indicative of the signal quality value measured with respect to the at least one candidate eNB, and trajectory information related to the route of the drone.

Furthermore, in this specification, the signal quality includes reference signal received power (RSRP), reference signal received quality (RSRQ) or reference signal strength indication (RSSI).

Furthermore, in this specification, the trajectory information includes past trajectory information indicative of a route along which the drone previously moved and future trajectory information indicative of a route along which the drone is to move in the future.

Furthermore, in this specification, the past trajectory information is provided by a prior serving eNB, and the number of prior serving eNBs providing the past trajectory information is limited to a specific number.

Furthermore, in this specification, the route along which the drone is to move in the future is previously determined, and at least one middle eNB is included in the route along which the drone is to move in the future.

Furthermore, in this specification, the method further includes receiving information related to the at least one middle eNB from a central controller. The information related to the at least one middle eNB includes at least one of ID information to identify the at least one middle eNB and position information indicative of the position coordinates of the at least one middle eNB.

Furthermore, this specification provides a method for supporting the handover of a drone in a wireless communication system. The method is performed by a serving eNB, and includes transmitting measurement control which instructs the drone to perform measurement, receiving a measurement report including a signal quality value of at least one candidate eNB from the drone, wherein the at least one candidate eNB is included in a candidate set configured by the drone and the signal quality value of the at least one candidate eNB is greater than a predetermined threshold for a specific period, and determining whether the handover of the drone is necessary based on the received measurement report.

Furthermore, in this specification, determining whether the handover of the drone is necessary includes comparing the signal quality value of the at least one candidate eNB with a signal quality value of the serving eNB and determining a target eNB on which the handover of the drone is to be performed based on a result of the comparison.

Furthermore, in this specification, the method further includes receiving control information related to the handover from the drone. The control information includes at least one of information about the ID of the at least one candidate eNB, signal quality information indicative of the signal quality value of the at least one candidate eNB, and trajectory information related to the route of the drone.

Furthermore, in this specification, the method further includes requesting load information indicative of a load state of the at least one candidate eNB to the at least one candidate eNB by the serving eNB and receiving a response including the requested load information from the at least one candidate eNB.

Furthermore, in this specification, the target eNB is determined based on at least one of the received control information and the load information.

Furthermore, in this specification, the target eNB includes a candidate eNB which belongs to the at least one candidate eNB and which has better signal quality than the serving eNB for a specific period.

Furthermore, in this specification, the control information is included in the measurement report.

Furthermore, in this specification, the method further includes transmitting a second message to request the control information to the drone. The second message is transmitted to the drone before the target eNB is determined.

Furthermore, this specification provides a drone performing handover in a wireless communication system. The drone includes a radio frequency (RF) unit for transceiving a radio signal and a processor functionally connected to the RF unit. The processor determines signal quality of one or more adjacent eNBs using reference signals (RSs) transmitted by the adjacent eNBs, configures a candidate set including at least one candidate eNB related to handover based on the measured signal quality, wherein a signal quality value measured with respect to the at least one candidate eNB is greater than a predetermined threshold, compares the signal quality of the at least one candidate eNB with signal quality of a serving eNB, and performs control so that a first message to request handover is transmitted to the serving eNB if, as a result of the comparison, the signal quality of the at least one candidate eNB is found to be better than the signal quality of the serving eNB for a specific period. The first message includes at least one of information about the ID of the at least one candidate eNB, signal quality information indicative of the signal quality value measured with respect to the at least one candidate eNB, and trajectory information related to the route of the drone.

Furthermore, this specification provides a method for supporting a handover of a drone in a wireless communication system. The method is performed by the drone and includes acquiring information for a movement path for moving to a specific place, wherein the movement path is configured to one or more eNBs; receiving at least one of location coordinate information or identification information for the one or more eNBs; checking whether at least one of the location coordinate information or identification information for the one or more eNBs is available; and moving to the specific place using the movement path if the at least one of the location coordinate information or the identification information is available.

Advantageous Effects

This specification has an advantage in that the handover of a drone having a lot of motions can be efficiently performed using trajectory information for a drone and load information for a candidate eNB.

Advantages to be obtained in this specification are not limited to the aforementioned advantages, and those skilled in the art to which the present invention pertains may evidently understand other advantages from the following description.

DESCRIPTION OF DRAWINGS

FIG. 1 is a view illustrating an Evolved Packet System which is associated with the Long Term Evolution (LTE) system to which the present invention may be applied.

FIG. 2 illustrates a wireless communication system to which the present invention is applied.

FIG. 3 illustrates a functional split of an E-UTRAN and an EPC to which the present invention may be applied.

FIG. 4a is a diagram illustrating radio protocol architecture for a user plane.

FIG. 4b is a diagram illustrating radio protocol architecture for a control plane.

FIG. 5 illustrates an Intra-MME/Serving Gateway handover to which the present invention may be applied.

FIG. 6 illustrates a communication path to which the present invention may be applied.

FIG. 7 is a schematic diagram of a cellular-based drone communication system to which a method proposed in this specification may be applied.

FIG. 8 is a flowchart illustrating an example of a handover method in cellular-based drone communication, which is proposed by this specification.

FIG. 9 is a flowchart illustrating another example of a handover method in cellular-based drone communication, which is proposed by this specification.

FIG. 10 is a diagram showing an example of a moving method of a drone whose route has been determined, which is proposed by this specification.

FIG. 11 is a flowchart illustrating an example of a method for supporting the handover of a drone, which is proposed by this specification.

FIG. 12 is a flowchart illustrating another example of a method for supporting the handover of a drone, which is proposed by this specification.

FIG. 13 is a flowchart illustrating an example of a method for moving a drone along a movement path, which is proposed by this specification.

FIG. 14 is a block diagram illustrating a wireless device in which methods as proposed herein may be implemented.

MODE FOR INVENTION

Reference will now be made in detail to the preferred embodiments of the present invention, examples of which are illustrated in the accompanying drawings. The detailed description set forth below in connection with the appended drawings is a description of exemplary embodiments and is not intended to represent the only embodiments through which the concepts explained in these embodiments may be practiced. The detailed description includes details for the purpose of providing an understanding of the present invention. However, it will be apparent to those skilled in the art that these teachings may be implemented and practiced without these specific details.

In some instances, known structures and devices are omitted, or are shown in block diagram form focusing on important features of the structures and devices, so as not to obscure the concept of the present invention.

In the embodiments of the present invention, the enhanced Node B (eNode B or eNB) may be a terminal node of a network, which directly communicates with the terminal. In some cases, a specific operation described as performed by the eNB may be performed by an upper node of the eNB. Namely, it is apparent that, in a network comprised of a plurality of network nodes including an eNB, various operations performed for communication with a terminal may be performed by the eNB, or network nodes other than the eNB. The term "eNB" may be replaced with a term, such as a "fixed station", a "base station (BS)", a "Node B", a "base transceiver system (BTS)", an "access point (AP)", a "macro eNB or master eNB (MeNB)" or a "secondary eNB (SeNB)." The term "UE" may be replaced with a term, such as a "terminal", a "mobile station (MS)", a "user terminal (UT)", a "mobile subscriber station (MSS)", a "subscriber station (SS)", a station (STA)", an "advanced mobile station (AMS)", a "wireless terminal (WT)", a machine-type communication (MTC) device", a "machine-to-machine (M2M) device", a "device-to-device (D2D) device" or a wireless device.

In the embodiments of the present invention, "downlink (DL)" refers to communication from the eNB to the UE, and "uplink (UL)" refers to communication from the UE to the eNB. In the downlink, transmitter may be a part of eNB, and receiver may be part of UE. In the uplink, transmitter may be a part of UE, and receiver may be part of eNB.

Specific terms used for the embodiments of the present invention are provided to aid in understanding of the present invention. These specific terms may be replaced with other terms within the scope and spirit of the present invention.

The embodiments of the present invention may be supported by standard documents disclosed for at least one of wireless access systems, Institute of Electrical and Electronics Engineers (IEEE) 802, 3rd Generation Partnership Project (3GPP), 3GPP Long Term Evolution (3GPP LTE), LTE-Advanced (LTE-A), LTE-Advanced Pro (LTE-A Pro), 5G New Radio (NR), and 3GPP2. Steps or parts that are not described to clarify the technical features of the present invention may be supported by those documents. Furthermore, all terms as set forth herein may be explained by the standard documents.

Techniques described herein may be used in various wireless access systems such as Code Division Multiple Access (CDMA), Frequency Division Multiple Access (FDMA), Time Division Multiple Access (TDMA), Orthogonal Frequency Division Multiple Access (OFDMA), Single Carrier-Frequency Division Multiple Access (SC-FDMA), 'non-orthogonal multiple access (NOMA)', etc. CDMA may be implemented as a radio technology such as Universal Terrestrial Radio Access (UTRA) or CDMA2000. TDMA may be implemented as a radio technology such as Global System for Mobile communications (GSM)/General Packet Radio Service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, Evolved-UTRA (E-UTRA) etc. UTRA is a part of Universal Mobile Telecommunication System (UMTS). 3GPP LTE is a part of Evolved UMTS (E-UMTS) using E-UTRA. 3GPP LTE employs OFDMA for downlink and SC-FDMA for uplink. LTE-A is an evolution of 3GPP LTE. LTE-A pro is an evolution of 3GPP LTE-A. 5G NR is a revolution of 3GPP LTE-A that will be implemented by OFDMA or its variants.

For the purposes of the present invention, the following abbreviations apply.

ACK Acknowledgement
AM Acknowledged Mode
AMBR Aggregate Maximum Bit Rate
ARQ Automatic Repeat Request
AS Access Stratum
BCCH Broadcast Control Channel
BCH Broadcast Channel
BSR Buffer Status Report
CA Carrier Aggregation
CC Component Carrier
CG Cell Group
CMAS Commercial Mobile Alert Service
CP Cyclic Prefix
CoMP Coordinated Multi Point
C-plane Control Plane
C-RNTI Cell RNTI
CQI Channel Quality Indicator
CRC Cyclic Redundancy Check
CRS Cell-specific Reference Signal
DC Dual Connectivity
DCCH DCN Dedicated Core Network
DeNB Donor eNB
DL Downlink
DRB Data Radio Bearer
ECM EPS Connection Management
EMM EPS Mobility Management
eIMTA Enhanced Interference Management and Traffic Adaptation
eNB E-UTRAN NodeB
EPC Evolved Packet Core
EPS Evolved Packet System
E-RAB E-UTRAN Radio Access Bearer
ETWS Earthquake and Tsunami Warning System
E-UTRA Evolved UTRA
E-UTRAN Evolved UTRAN
FDD Frequency Division Duplex
FDM Frequency Division Multiplexing
GERAN GSM EDGE Radio Access Network
GNSS Global Navigation Satellite System
GSM Global System for Mobile communication
GBR Guaranteed Bit Rate
GP Guard Period
HARQ Hybrid ARQ
(H)eNB eNB or Home Enb
HFN Hyper Frame Number
HO Handover
HPLMN Home Public Land Mobile Network
HSDPA High Speed Downlink Packet Access
ID Identification or Identifier
IP Internet Protocol
LTE Long Term Evolution
MAC Medium Access Control
MBMS Multimedia Broadcast Multicast Service
MBR Maximum Bit Rate
MBSFN Multimedia Broadcast multicast service Single Frequency Network
MCG Master Cell Group
MeNB Master eNB
MIB Master Information Block
MIMO Multiple Input Multiple Output
MME Mobility Management Entity
MTC Machine-Type Communications
NACK Negative Acknowledgement
NAS Non-Access Stratum
OFDM Orthogonal Frequency Division Multiplexing
OFDMA Orthogonal Frequency Division Multiple Access
P-GW PDN Gateway
PAPR Peak-to-Average Power Ratio
PCell Primary Cell
PDCCH Physical Downlink Control CHannel
PDCP Packet Data Convergence Protocol
PDN Packet Data Network
PDSCH Physical Downlink Shared CHannel
PDU Protocol Data Unit
PHY Physical layer
PLMN Public Land Mobile Network
ProSe Proximity based Services
PSCell Primary SCell
PUCCH Physical Uplink Control CHannel
PUSCH Physical Uplink Shared CHannel
PWS Public Warning System QoS Quality of Service
RACH Random Access Channel
RB Radio Bearer
RF Radio Frequency
RLC Radio Link Control
RN Relay Node
RNC Radio Network Controller
RNL Radio Network Layer
RNTI Radio Network Temporary Identifier
ROHC Robust Header Compression
RRC Radio Resource Control
RRM Radio Resource Management
S-GW Serving Gateway
S1-MME S1 for the control plane
SCC Secondary Component Carrier
SCell Secondary Cell
SCG Secondary Cell Group
SeNB Secondary eNB
SI System Information
SIB System Information Block
S1-U S1 for the user plane
SAE System Architecture Evolution
SAP Service Access Point
SC-FDMA Single Carrier-Frequency Division Multiple Access
SDF SFN System Frame Number
SDU Service Data Unit
S-GW Serving GateWay
SRB Signalling Radio Bearer
TCP Transmission Control Protocol
TDD Time Division Duplex
TDM Time Division Multiplexing
TNL Transport Network Layer
TTI Transmission Time Interval
UE User Equipment
UL Uplink
UM Unacknowledged Mode
UMTS Universal Mobile Telecommunication System
U-plane User plane
UTRA Universal Terrestrial Radio Access
UTRAN Universal Terrestrial Radio Access Network
WLAN Wireless Local Area Network
X2 GW X2 GateWay
X2-C X2-Control plane
X2-U X2-User plane For the purposes of the present invention, the following terms and definitions apply.

Access Control: the process that checks whether a UE is allowed to access and to be granted services in a closed cell.

Carrier frequency: center frequency of the cell.

Cell: combination of downlink and optionally uplink resources. The linking between the carrier frequency of the downlink resources and the carrier frequency of the uplink resources is indicated in the system information transmitted on the downlink resources.

Cell Group: in dual connectivity, a group of serving cells associated with either the MeNB or the SeNB.

Dual Connectivity: mode of operation of a UE in RRC_CONNECTED, configured with a Master Cell Group and a Secondary Cell Group.

E-RAB: an E-RAB uniquely identifies the concatenation of an S1 Bearer and the corresponding Data Radio Bearer. When an E-RAB exists, there is a one-to-one mapping between this E-RAB and an EPS bearer of the Non Access Stratum as defined in [17].

Handover: procedure that changes the serving cell of a UE in RRC_CONNECTED.

Make-Before-Break HO/SeNB change: maintaining source eNB/SeNB connection after reception of RRC message for handover or change of SeNB before the initial uplink transmission to the target eNB during handover or change of SeNB.

Master Cell Group: in dual connectivity, a group of serving cells associated with the MeNB, comprising of the PCell and optionally one or more SCells.

Master eNB: in dual connectivity, the eNB which terminates at least S1-MME.

MCG bearer: in dual connectivity, a bearer whose radio protocols are only located in the MeNB to use MeNB resources only.

Power saving mode: mode configured and controlled by NAS that allows the UE to reduce its power consumption.

ProSe UE-to-Network Relay: a UE that provides functionality to support connectivity to the network for Remote UE(s).

ProSe UE-to-Network Relay Selection: Process of identifying a potential ProSe UE-to Network Relay, which can be used for connectivity services (e.g. to communicate with a PDN).

ProSe UE-to-Network Relay Reselection: process of changing previously selected ProSe UE-to-Network Relay and identifying potential a new ProSe UE-to-Network Relay, which can be be used for connectivity services (e.g. to communicate with PDN).

Public Safety ProSe Carrier: carrier frequency for public safety sidelink communication and public safety sidelink discovery.

Remote UE: a ProSe-enabled Public Safety UE, that communicates with a PDN via a ProSe UE-to-Network Relay.

SCG bearer: in dual connectivity, a bearer whose radio protocols are only located in the SeNB to use SeNB resources.

Secondary Cell Group: in dual connectivity, a group of serving cells associated with the SeNB, comprising of PSCell and optionally one or more SCells.

Secondary eNB: in dual connectivity, the eNB that is providing additional radio resources for the UE but is not the Master eNB.

Sidelink: UE to UE interface for sidelink communication, V2X sidelink communication and sidelink discovery.

Sidelink communication: AS functionality enabling ProSe Direct Communication, between two or more nearby UEs, using E-UTRA technology but not traversing any network node. In this version, the terminology "sidelink communication" without "V2X" prefix only concerns PS unless specifically stated otherwise.

Split bearer: in dual connectivity, a bearer whose radio protocols are located in both the MeNB and the SeNB to use both MeNB and SeNB resources.

FIG. 1 is a view illustrating an Evolved Packet System which is associated with the Long Term Evolution (LTE) system to which the present invention may be applied. The LTE system aims to provide seamless Internet Protocol (IP) connectivity between UE 10 and a pack data network (PDN), without any disruption to an end user's application during mobility. While the LTE system encompasses the evolution of the radio access through an Evolved Universal Terrestrial Radio Access Network (E-UTRAN) which defines radio protocol architecture between a user equipment and a BS 20, it is accompanied by the evolution of non-radio aspects under the term "System Architecture Evolution (SAE)" which includes an Evolved Packet Core (EPC) network. The LTE and SAE include an Evolved Packet System (EPS).

The EPS uses the concept of EPS bearers to route IP traffic from a gateway in the PDN to the UE. A bearer is an IP packet flow with a specific Quality of Service (QoS) between the gateway and the UE. The E-UTRAN and EPC together set up and release the bearers as required by applications.

The EPC, which is also referred to as a Core Network (CN), controls the UE and manages establishment of the bearers. As depicted in FIG. 1, the (logical or physical) node of the EPC in the SAE includes a Mobility Management Entity (MME) 30, a PDN gateway (PDN-GW or P-GW) 50, a Serving Gateway (S-GW) 40, a Policy and Charging Rules Function (PCRF) 60, a Home subscriber Server (HSS) 70, etc.

The MME 30 is the control node which processes the signaling between the UE and the CN. The protocols running between the UE and the CN are known as the Non-Access Stratum (NAS) protocols. Examples of functions supported by the MME 30 includes functions related to bearer management, which includes the establishment, maintenance and release of the bearers and is handled by the session management layer in the NAS protocol, and functions related to connection management, which includes the establishment of the connection and security between the network and UE, and is handled by the connection or mobility management layer in the NAS protocol layer.

The S-GW 40 serves as the local mobility anchor for the data bearers when the UE moves between eNodeBs. All user IP packets are transferred through the S-GW 40. The S-GW 40 also retains information about the bearers when the UE is in idle state (known as EPS Connection Management (ECM)-IDLE) and temporarily buffers downlink data while the MME initiates paging of the UE to re-establish the bearers. Furthermore, it also serves as the mobility anchor for inter-working with other 3GPP technologies such as GPRS (General Packet Radio Service) and UMTS (Universal Mobile Telecommunications System).

The P-GW 50 serves to perform IP address allocation for the UE, as well as QoS enforcement and flow-based charging according to rules from the PCRF 60. The P-GW 50 performs Quality of Service (QoS) enforcement for Guaranteed Bit Rate (GBR) bearers. It also serves as the mobility anchor for inter-working with non-3GPP technologies such as CDMA2000 and WiMAX networks.

The PCRF 60 serves to perform policy control decision-making, as well as for controlling the flow-based charging functionalities.

The HSS 70, which is also referred to as a Home Location Register (HLR), contains users' SAE subscription data such as the EPS-subscribed QoS profile and any access restrictions for roaming. Furthermore, it also holds information about the PDNs to which the user may connect. This may be in the form of an Access Point Name (APN), which is a label according to a Domain Name system (DNS) naming conventions describing the access point to the PDN, or a PDN Address which indicates subscribed IP addresses.

Various interfaces, such as an S1-U, S1-MME, S5/S8, S11, S6a, Gx, Rx and SGi, are defined between the EPS network elements shown in FIG. 1.

Hereinafter, the concept of Mobility Management (MM) and an MM back-off timer is explained in detail. The mobility management is a procedure to reduce the overhead in the E-UTRAN and processing in the UE. When the mobility management is performed, all UE-related information in the access network may be released during periods of data inactivity. This state may be referred to as EPS Connection Management IDLE (ECM-IDLE). The MME retains the UE context and the information about the established bearers during the idle periods.

To allow the network to contact UE in the ECM-IDLE, the UE updates the network as to its new location whenever it moves out of its current Tracking Area (TA). This procedure is called a "Tracking Area Update", and a similar procedure is also defined in a universal terrestrial radio access network (UTRAN) or GSM EDGE Radio Access Network (GERAN) system and is called a "Routing Area Update." The MME serves to keep track of the user location while the UE is in the ECM-IDLE state.

When there is a need to deliver downlink data to the UE in the ECM-IDLE state, the MME transmits the paging message to all BSs (i.e., eNodeBs) in its current tracking area (TA). Thereafter, eNBs start to page the UE over the radio interface. On receipt of a paging message, the UE performs a certain procedure which results in changing the UE to ECM-CONNECTED state. This procedure is called a "Service Request Procedure." UE-related information is thereby created in the E-UTRAN, and the bearers are re-established. The MME is responsible for the re-establishment of the radio bearers and updating the UE context in the eNodeB.

When the above-explained mobility management (MM) is applied, a mobility management (MM) back-off timer may be further used. In particular, the UE may transmit a Tracking Area Update (TAU) to update the TA, and the MME may reject the TAU request due to core network congestion, with a time value associated with the MM back-off timer. Upon receipt of the time value, the UE may activate the MM back-off timer.

FIG. 2 illustrates a wireless communication system to which the present invention is applied. The wireless communication system may also be referred to as an evolved-UMTS terrestrial radio access network (E-UTRAN) or a long term evolution (LTE)/LTE-A/LTE-A Pro system.

The E-UTRAN includes at least one BS 20 which provides a control plane and a user plane to UE 10. The UE 10 may be fixed or mobile, and may be referred to as another terminology, such as an MS, a UT, an SS, an MT, a station (STA), a machine to machine (M2M) device, a device to device (D2D) device or a wireless device. The BS 20 is generally a fixed station that communicates with the UE 10 and may be referred to as another terminology, such as an evolved node-B (eNB), a base transceiver system (BTS), an access point (AP), etc.

The BSs 20 are interconnected by means of an X2 interface. The BSs 20 are also connected by means of an S1 interface to an Evolved Packet Core (EPC), more specifically, to an MME through S1-MME and to an S-GW through S1-U.

The EPC includes an MME, an S-GW, and a P-GW. The MME has access information of the UE or capability information of the UE, and such information is generally used for mobility management of the UE. The S-GW is a gateway having an E-UTRAN as an end point. The P-GW is a gateway having a PDN as an end point.

The layers of a radio interface protocol between the UE and the network may be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

FIG. 3 illustrates a functional split of an E-UTRAN and an EPC to which the present invention may be applied.

Referring to the FIG. 3, the eNB may perform functions of selection for a gateway (e.g., an MME), routing toward the gateway during Radio Resource Control (RRC) activation, scheduling and transmitting of paging messages, scheduling and transmitting of broadcast channel (BCH) information, dynamic allocation of resources to the UEs in both uplink and downlink, configuration and provisioning of eNB measurements, radio bearer control, Radio Admission Control (RAC), and connection mobility control in LTE_ACTIVE state. In the EPC, and as mentioned above, the gateway may perform functions of paging origination, LTE IDLE state management, ciphering of the user plane, System Architecture Evolution (SAE) bearer control, and ciphering and integrity protection of non-access stratum (NAS) signaling.

FIG. 4a is a diagram illustrating radio protocol architecture for a user plane. FIG. 4b is a diagram illustrating radio protocol architecture for a control plane. The user plane is a protocol stack for user data transmission. The control plane is a protocol stack for control signal transmission.

Referring to FIGS. 4a and 4b, a PHY layer provides an upper layer with an information transfer service through a physical channel. The PHY layer is connected to a Medium Access Control (MAC) layer which is an upper layer of the PHY layer through a transport channel. Data is transferred between the MAC layer and the PHY layer through the transport channel. The transport channel is classified according to how and with what characteristics data is transmitted through a radio interface.

Data is transferred through a physical channel between different PHY layers, that is, the PHY layer of a transmitter and the PHY layer of a receiver. The physical channel is modulated using an orthogonal frequency division multiplexing (OFDM) scheme, and utilizes time and frequency as a radio resource.

A function of the MAC layer includes mapping between a logical channel and a transport channel and multiplexing/de-multiplexing on a transport block provided to a physical channel over a transport channel of a MAC service data unit (SDU) belonging to the logical channel. The MAC layer provides a service to a radio link control (RLC) layer through the logical channel.

A function of the RLC layer includes RLC SDU concatenation, segmentation, and reassembly. To ensure a variety of quality of service (QoS) required by a radio bearer (RB), the RLC layer provides three operation modes, i.e., a transparent mode (TM), an unacknowledged mode (UM), and an acknowledged mode (AM). The AM RLC provides error correction by using an automatic repeat request (ARQ).

Functions of a packet data convergence protocol (PDCP) layer in the user plane include user data delivery, header compression, and ciphering. Functions of a PDCP layer in the control plane include control-plane data delivery and ciphering/integrity protection.

A radio resource control (RRC) layer is defined only in the control plane. The RRC layer serves to control the logical channel, the transport channel, and the physical channel in association with configuration, reconfiguration and release of radio bearers (RBs). An RB is a logical path provided by the first layer (i.e., PHY layer) and the second layer (i.e., MAC layer, RLC layer, and PDCP layer) for data delivery between the UE and the network.

The configuration of the RB implies a process for specifying a radio protocol layer and channel properties to provide a specific service and for determining respective detailed parameters and operations. The RB may be classified into two types, i.e., a signaling RB (SRB) and a data RB (DRB). The SRB is used as a path for transmitting an RRC message in the control plane. The DRB is used as a path for transmitting user data in the user plane.

When an RRC connection exists between an RRC layer of the UE and an RRC layer of the network, the UE is in an RRC connected state, and otherwise the UE is in an RRC idle state.

Data is transmitted from the network to the UE through a downlink transport channel. Examples of the downlink transport channel include a broadcast channel (BCH) for transmitting system information and a downlink-shared channel (SCH) for transmitting user traffic or control messages. The user traffic of downlink multicast or broadcast services or the control messages may be transmitted on the downlink-SCH or an additional downlink multicast channel (MCH). Data is transmitted from the UE to the network through an uplink transport channel. Examples of the uplink transport channel include a random access channel (RACH) for transmitting an initial control message and an uplink SCH for transmitting user traffic or control messages.

Examples of logical channels belonging to a higher channel of the transport channel and mapped onto the transport channels include a broadcast channel (BCCH), a paging control channel (PCCH), a common control channel (CCCH), a multicast control channel (MCCH), a multicast traffic channel (MTCH), etc.

The physical channel includes several symbols in a time domain and several sub-carriers in a frequency domain. One sub-frame includes a plurality of symbols in the time domain. One subframe includes a plurality of resource blocks. One resource block includes a plurality of symbols and a plurality of sub-carriers. Furthermore, each subframe may use specific sub-carriers of specific symbols (e.g., a first symbol) of a corresponding subframe for a physical downlink control channel (PDCCH), i.e., an L1/L2 control channel. A transmission time interval (TTI) is a unit time of data transmission, and is 1 millisecond (ms) which corresponds to one subframe.

Hereinafter, the RRC state and RRC connection of UE will be disclosed.

The RRC state indicates whether an RRC layer of the UE is logically connected to an RRC layer of an E-UTRAN. If the two layers are connected to each other, it is called an RRC connected state, and if the two layers are not connected to each other, it is called an RRC idle state. In the RRC connected state, the UE has an RRC connection and thus the E-UTRAN may recognize a presence of the UE in a cell unit. Accordingly, the UE may be effectively controlled. On the other hand, when in the RRC idle state, the UE cannot be recognized by the E-UTRAN, and is managed by a core network in a tracking area unit which is a unit of a wider area than a cell. That is, regarding the UE in the RRC idle state, only a presence or absence of the UE is recognized in a wide area unit. To get a typical mobile communication service such as voice or data, a transition to the RRC connected state is necessary.

When a user initially powers on the UE, the UE first searches for a proper cell and thereafter stays in the RRC idle state in the cell. Only when there is a need to establish an RRC connection, the UE staying in the RRC idle state establishes the RRC connection with the E-UTRAN through an RRC connection procedure and then transitions to the RRC connected state. Examples of a case where the UE in the RRC idle state needs to establish the RRC connection are various, such as a case where uplink data transmission is necessary due to telephony attempt of the user or the like or a case where a response message is transmitted in response to a paging message received from the E-UTRAN.

General Handover (HO)

Handover

The intra E-UTRAN HO of a UE in RRC_CONNECTED state is a UE-assisted network-controlled HO, with HO preparation signaling in E-UTRAN:

Part of the HO command comes from the target eNB and is transparently forwarded to the UE by the source eNB;

To prepare the HO, the source eNB passes all necessary information to the target eNB (e.g. E-RAB attributes and RRC context):

When carrier aggregation (CA) is configured and to enable secondary cell (SCell) selection in the target eNB, the source eNB can provide in decreasing order of radio quality a list of the best cells and optionally measurement result of the cells.

When dual connectivity (DC) is configured, the source Master eNB (MeNB) provides the secondary cell group (SCG) configuration (in addition to the Master Cell Group (MCG) configuration) to the target MeNB.

Both the source eNB and UE keep some context (e.g. C-RNTI) to enable the return of the UE in case of HO failure;

UE accesses the target cell via RACH (random access channel) following a contention-free procedure using a dedicated RACH preamble or following a contention-based procedure if dedicated RACH preambles are not available:

the UE uses the dedicated preamble until the handover procedure is finished (successfully or unsuccessfully);

If the RACH procedure towards the target cell is not successful within a certain time, the UE initiates radio link failure recovery using a suitable cell;

No ROHC (Robust Header Compression) context is transferred at handover;

ROHC context can be kept at handover within the same eNB.

C (Control)-Plane Handling

The preparation and execution phase of the HO procedure is performed without EPC involvement. That is, preparation messages are directly exchanged between the eNBs. The release of the resources at the source side during the HO completion phase is triggered by the eNB. In case an relay node (RN) is involved, its donor eNB (DeNB) relays the appropriate S1 messages between the RN and the MME (S1-based handover) and X2 messages between the RN and target eNB (X2-based handover); the DeNB is explicitly aware of a UE attached to the RN due to the S1 proxy and X2 proxy functionality.

FIG. 5 depicts the basic handover scenario where neither MME nor Serving Gateway changes:

FIG. 5 illustrates an Intra-MME/Serving Gateway handover to which the present invention may be applied.

Below is a more detailed description of the intra-MME/Serving Gateway HO procedure:

0. The UE context within the source eNB contains information regarding roaming and access restrictions which were provided either at connection establishment or at the last TA update.

1. The source eNB configures the UE measurement procedures according to the roaming and access restriction information and e.g. the available multiple frequency band information. Measurements provided by the source eNB may assist the function controlling the UE's connection mobility.

2. A measurement report is triggered and sent to the source eNB.

3. The source eNB makes decision based on MEASUREMENT REPORT and RRM information to hand off the UE.

4. The source eNB issues a HANDOVER REQUEST message to the target eNB passing necessary information to prepare the HO at the target side (UE X2 signalling context reference at source eNB, UE S1 EPC signalling context reference, target cell ID, eNB key (KeNB), RRC context including the C-RNTI of the UE in the source eNB, AS-configuration, E-RAB context and physical layer ID of the source cell+short MAC-I for possible RLF recovery). UE X2/UE S1 signalling references enable the target eNB to address the source eNB and the EPC. The E-RAB context includes necessary radio network layer (RNL) and transport network layer (TNL) addressing information, and QoS profiles of the E-RABs.

5. Admission Control may be performed by the target eNB dependent on the received E-RAB QoS information to increase the likelihood of a successful HO, if the resources can be granted by target eNB. The target eNB configures the required resources according to the received E-RAB QoS information and reserves a C-RNTI and optionally a RACH preamble. The AS-configuration to be used in the target cell can either be specified independently (i.e. an "establishment") or as a delta compared to the AS-configuration used in the source cell (i.e. a "reconfiguration").

6. The target eNB prepares HO with L1/L2 and sends the HANDOVER REQUEST ACKNOWLEDGE to the source eNB. The HANDOVER REQUEST ACKNOWLEDGE message includes a transparent container to be sent to the UE as an RRC message to perform the handover. The container includes a new C-RNTI, target eNB security algorithm identifiers for the selected security algorithms, may include a dedicated RACH preamble, and possibly some other parameters i.e. access parameters, SIBs, etc. The HANDOVER REQUEST ACKNOWLEDGE message may also include RNL/TNL information for the forwarding tunnels, if necessary.

As soon as the source eNB receives the HANDOVER REQUEST ACKNOWLEDGE, or as soon as the transmission of the handover command is initiated in the downlink, data forwarding may be initiated.

Steps 7 to 16 provide means to avoid data loss during HO and are further detailed in 10.1.2.1.2 and 10.1.2.3.

7. The target eNB generates the RRC message to perform the handover, that is, an RRCConnectionReconfiguration message including the mobilityControlInformation, to be sent by the source eNB towards the UE. The source eNB performs the necessary integrity protection and ciphering of the message. The UE receives the RRCConnectionReconfiguration message with necessary parameters (i.e. new C-RNTI, target eNB security algorithm identifiers, and optionally dedicated RACH preamble, target eNB SIBs, etc.) and is commanded by the source eNB to perform the HO. The UE does not need to delay the handover execution for delivering the HARQ/ARQ responses to source eNB.

8. The source eNB sends the SN (Sequence Number) STATUS TRANSFER message to the target eNB to convey the uplink PDCP SN receiver status and the downlink PDCP SN transmitter status of E-RABs for which PDCP status preservation applies (i.e. for RLC AM). The uplink PDCP SN receiver status includes at least the PDCP SN of the first missing UL SDU (Service Data Unit) and may include a bit map of the receive status of the out of sequence UL SDUs that the UE needs to retransmit in the target cell, if there are any such SDUs. The downlink PDCP SN transmitter status indicates the next PDCP SN that the target eNB shall assign to new SDUs, not having a PDCP SN yet. The source eNB may omit transmitting this message if none of the E-RABs of the UE shall be treated with PDCP status preservation.

9. After receiving the RRCConnectionReconfiguration message including mobilityControlInformation, UE performs synchronization to target eNB and accesses the target cell via RACH, following a contention-free procedure if a dedicated RACH preamble was indicated in mobilityControlInformation, or following a contention-based procedure if no dedicated preamble was indicated. UE derives target eNB specific keys and configures the selected security algorithms to be used in the target cell.

10. The target eNB responds with UL allocation and timing advance.

11. When the UE has successfully accessed the target cell, the UE sends the RRCConnectionReconfigurationComplete message (C-RNTI) to confirm the handover, along with an uplink Buffer Status Report, whenever possible, to the target eNB to indicate that the handover procedure is completed for the UE. The target eNB verifies the C-RNTI sent in the RRCConnectionReconfigurationComplete message. The target eNB can now begin transmitting data to the UE.

12. The target eNB sends a PATH SWITCH REQUEST message to MME to inform that the UE has changed cell.

13. The MME sends a MODIFY BEARER REQUEST message to the Serving Gateway.

14. The Serving Gateway switches the downlink data path to the target side. The Serving gateway sends one or more "end marker" packets on the old path to the source eNB and then can release any U-plane/TNL resources towards the source eNB.

15. The Serving Gateway sends a MODIFY BEARER RESPONSE message to MME.

16. The MME confirms the PATH SWITCH REQUEST message with the PATH SWITCH REQUEST ACKNOWLEDGE message.

17. By transmitting the UE CONTEXT RELEASE message, the target eNB informs success of HO to source eNB and triggers the release of resources by the source eNB. The target eNB sends this message after the PATH SWITCH REQUEST ACKNOWLEDGE message is received from the MME.

18. Upon reception of the UE CONTEXT RELEASE message, the source eNB can release radio and C-plane related resources associated to the UE context. Any ongoing data forwarding may continue.

When an X2 handover is used involving HeNBs and when the source HeNB is connected to a HeNB GW, a UE CONTEXT RELEASE REQUEST message including an explicit GW Context Release Indication is sent by the source HeNB, in order to indicate that the HeNB GW may release of all the resources related to the UE context.

U-Plane Handling

The U-plane handling during the Intra-E-UTRAN-Access mobility activity for UEs in ECM-CONNECTED takes the following principles into account to avoid data loss during HO:

During HO preparation U-plane tunnels can be established between the source eNB and the target eNB. There is one tunnel established for uplink data forwarding and another one for downlink data forwarding for each E-RAB for which data forwarding is applied. In the case of a UE under an RN performing handover, forwarding tunnels can be established between the RN and the target eNB via the DeNB.

During HO execution, user data can be forwarded from the source eNB to the target eNB. The forwarding may take place in a service and deployment dependent and implementation specific way.

Forwarding of downlink user data from the source to the target eNB should take place in order as long as packets are received at the source eNB from the EPC or the source eNB buffer has not been emptied.

During HO completion:

The target eNB sends a PATH SWITCH message to MME to inform that the UE has gained access and MME sends a MODIFY BEARER REQUEST message to the Serving Gateway, the U-plane path is switched by the Serving Gateway from the source eNB to the target eNB.

The source eNB should continue forwarding of U-plane data as long as packets are received at the source eNB from the Serving Gateway or the source eNB buffer has not been emptied.

For RLC-AM bearers:

During normal HO not involving Full Configuration:

For in-sequence delivery and duplication avoidance, PDCP SN is maintained on a bearer basis and the source eNB informs the target eNB about the next DL PDCP SN to allocate to a packet which does not have a PDCP sequence number yet (either from source eNB or from the Serving Gateway).

For security synchronization, HFN (Hyper Frame Number) is also maintained and the source eNB provides to the target one reference HFN for the UL and one for the DL i.e. HFN and corresponding SN.

In both the UE and the target eNB, a window-based mechanism is needed for duplication detection.

The occurrence of duplicates over the air interface in the target eNB is minimized by means of PDCP SN based reporting at the target eNB by the UE. In uplink, the reporting is optionally configured on a bearer basis by the eNB and the UE should first start by transmitting those reports when granted resources in the target eNB. In downlink, the eNB is free to decide when and for which bearers a report is sent and the UE does not wait for the report to resume uplink transmission.

The target eNB re-transmits and prioritizes all downlink PDCP SDUs forwarded by the source eNB (i.e. the target eNB should send data with PDCP SNs from X2 before transmitting data from S1), with the exception of PDCP SDUs of which the reception was acknowledged through PDCP SN based reporting by the UE.

The UE re-transmits in the target eNB all uplink PDCP SDUs starting from the first PDCP SDU following the last consecutively confirmed PDCP SDU i.e. the oldest PDCP SDU that has not been acknowledged at RLC in the source, excluding the PDCP SDUs of which the reception was acknowledged through PDCP SN based reporting by the target.

During HO involving Full Configuration:

The following description below for RLC-UM bearers also applies for RLC-AM bearers. Data loss may happen.

For RLC-UM Bearers:

The PDCP SN and HFN are reset in the target eNB.

No PDCP SDUs are retransmitted in the target eNB.

The target eNB prioritizes all downlink PDCP SDUs forwarded by the source eNB if any (i.e. the target eNB should send data with PDCP SNs from X2 before transmitting data from S1).

The UE PDCP entity does not attempt to retransmit any PDCP SDU in the target cell for which transmission had been completed in the source cell. Instead UE PDCP entity starts the transmission with other PDCP SDUs.

Connectivity for Drones

The objective is to provide use cases concerning connection of drones.

Use Cases can be:

Phil is a farm worker who has 55 hectares planted with sensitive cultures. He wants to survey, in real time, the fields and the state of the crops. He uses a drone and a remote control that are both connected to the mobile network. Due to low latency, Phil is able to control the drone and is also able to analyze, in real time, the video and infrared imaging of the fields that are streamed from the cameras and sensors. This provides all necessary information for decision making on irrigation, fertilizer and pesticide distribution Jack works for a TV station as a cameraman. He or she uses a drone to live broadcast outdoor events like marathon, F1 auto racing. High quality live video (e.g. Full HD, 4K) is transmitted from the flying drone to the TV station via the mobile network.

In many scenarios, the drone flies in low altitude. The drone needs to maintain continuous connection with the mobile network which requires the network supports continuous wireless coverage in low altitude flight scenarios.

A drone and remote control are connected to the mobile network.

The drone is piloted with remote mode, data being transmitted via the network.

The drone transmits video and with other data, such as infrared pictures.

FIG. 6 illustrates a communication path to which the present invention may be applied.

Specifically, FIG. 6 depicts how communication will occur, in this use case communication occurs through the mobile network (wide area network (WAN)). Communication does not occur node to node or through a wireless controller (local area network (LAN))

Potential Service Requirements

The 3GPP system shall be able, in the context of Internet of Things, to provide best solutions for applications using, for example drones or robotics. All requirements are for end to end performance, defined as communications sent by source and communication received by target.

The 3GPP system shall support:

Round trip latency less than [150 ms], including all network components.

Due to consequences of failure being loss of property or life, reliability goal is [near 100%.]

Reliability to be at the same level for current aviation Air Traffic Control (ATC). Link supports command and control of vehicles in controlled airspace.

Priority, Precedence, Preemption (PPP) mechanisms shall be used to ensure sufficient reliability metrics are reached.

Position accuracy within [10 cm] to avoid damage to property or life in densely populated areas.

Provide continuous wireless coverage, high speed uplink bandwidth at least [20 Mbps], for a flying UE at low altitude of [10-1000] meters with the high speed as maximum as [300 km/h].

Utilization of the drones is started to find many new uses in enhancing our way of life such as on-demand package delivery, traffic control and surveillance, search and rescue, wild life surveillance, agriculture, cinematography, etc. Since the cellular networks are almost ubiquitously present, the control and data communications from/to drones using the cellular networks seems legitimate choice and, as the matter of fact, much research efforts are devoted to it.

Cellular networks are fundamentally designed to support the terrestrial-based communications. The communications from/to drones require the management and connection establishment over the sky. Hence, design approach to support drone communications using the cellular networks are reconsidered and modified. Especially, terrestrial-based handover algorithm and mechanism will be reconsidered. In this invention, we identify the possible environmental difference present in conventional and drone communications, and propose the handover methods that will provide a reduced signaling burden to the cellular networks.

In 3GPP, drone-based communications are considered one of the use cases in 5G communications.

Especially, it considers the operation of and communications with the drones up to 1000 meters. In this scenario, there will be a high chance for the drone to detect the signals from more than one eNB.

Another application of the drone that major companies like Amazon considers is on-demand package delivery in metropolitan areas. In this scenario, the drone will see many pico-cells deployed over the metropolitan area.

FIG. 7 shows the pictorial illustration of the scenario. The communication links between the drone and many eNBs will be line-of-sight (LOS) most of the time, and thus the difference in signal strength may not be noticeable as in the terrestrial-based cellular communications.

If the conventional handover method and algorithm based on the predetermined threshold are applied, some problems can be incurred:

frequent handover may be observed signaling overhead may be increased due to frequent handover attempts In this invention, we consider efficient handover method and algorithms, for UE(s) in RRC_Connected mode (but not limited to RRC_Connected mode), that will reduce the signalling overhead.

Both UE (drone)-initiated and network-initiated, but network-controlled handover are considered.

From now on, UE will imply the drone if the special interpretation is missing.

FIG. 7 shows the scenario of operation considered in this invention in which UE sees transmission from multiple eNBs.

That is, FIG. 7 is a schematic diagram of a cellular-based drone communication system to which a method proposed in this specification may be applied.

As shown in FIG. 7, from a standpoint of a drone, cell coverage is greater than cell coverage when UE is placed on the ground.

That is, if UE is an object in the air, cell coverage of the UE is increased.

In this case, an influence attributable to an impact on a cell is greatly reduced because a random variance in the cell coverage is reduced.

Furthermore, from a standpoint of the drone, cell coverage may be provided by a single eNB, or may be provided through a plurality of eNBs.

Furthermore, in the case of an environment in which many small cells, such as pico cells and micro cells, are deployed, from a standpoint of a drone, a plurality of small cells may look overlapped.

In this case, the drone may need to skip handover to a specific eNB.

A method for efficiently support the handover of a drone in cellular-based drone communication, which is proposed by this specification, is described in detail below.

A handover method in cellular-based drone communication which is proposed by this specification may be basically divided into (1) a UE-initiated and network-controlled handover method (hereinafter referred to as the "method 1") and a (2) network-initiated and network-controlled handover method (hereinafter referred to as the "method 2").

(Method 1)

First, the method 1, that is, the UE-initiated and network-controlled handover method, is described below.

Prior to a description of the method 1, the concept of a candidate set is first defined.

The candidate set means a set of eNBs through which UE is capable of receiving signal quality (e.g., signal strength) of a specific level, and may be configured by the UE.

Furthermore, when the UE is in RRC_Connected mode, the candidate set may be configured by the UE.

That is, the candidate set may be defined as a set of eNB(s) which send reference signals (RSs) with strength of a predetermined signal level or more.

Accordingly, the UE may receive the reference signals (RSs) from the eNBs, may compare the received RSs with the predetermined signal level, and may configure or determine eNBs which have sent RSs having the predetermined signal level or more as or to be a candidate set.

During a specific period (or interval), if eNB(s) showing received signal quality of a specific level higher than that of a serving eNB are present, the UE triggers a request for handover to the serving eNB.

In this case, the eNB(s) showing the received signal quality of the specific level are eNBs within the candidate set.

In this case, signal strength(s) measured by the UE and eNB ID(s) that trigger the handover request are provided to the serving eNB.

Thereafter, if the UE provides one or more eNB ID(s) to the serving eNB, the serving eNB determines a list of target eNBs based on at least one of trajectory information for the UE provided by a prior serving eNB, trajectory information for the UE monitored by a current serving eNB, information provided by the UE in the handover request, and load information for the eNB(s) within the candidate set.

The load information for the eNB(s) within the candidate set may be exchanged through the X2 interface.

Furthermore, in the list of target eNBs, the target eNBs may be sequentially arranged according to a specific criterion.

For example, the serving eNB may down-select one or more eNBs from the candidate set.

The specific criterion may include handover priority.

For example, the first eNB of the list of predetermined target eNBs may have the highest priority for handover, the second eNB thereof may have next priority, and the last eNB may have the lowest priority.

Thereafter, the serving eNB initiates a handover procedure along with a selected (or determined) target eNB.

That is, the serving eNB sends a handover request message to the selected target eNB.

Thereafter, if the serving eNB receives a response indicative of the permission of the handover procedure from the selected target eNB, the serving eNB provides the selected target eNB with accumulated trajectory information for the UE.

Thereafter, the serving eNB permits the UE to contact the target eNB for the handover procedure of the UE.

(Method 2)

The method 2, that is, the network-initiated and network-controlled handover method, is described below.

If received signal quality from UE does not satisfy a specific requirement, a serving eNB requests the UE to provide a measurement report or measurement control to the serving eNB.

In this case, the UE provides the serving eNB with measured values corresponding to a candidate list (or a candidate set) of eNBs.

In this case, the candidate set may be configured by the UE.

Steps after the UE sends the measurement report to the serving eNB (i.e., steps from the step in which the serving eNB determines a target eNB) is the same as that of the method 1.

The eNBs of the candidate list are eNBs whose signal strength measured by the UE exceeds a specific threshold, and includes eNBs monitored by the UE.

That is, the same procedure as that of the method 1 is described in brief below.

Thereafter, if the UE provides one or more eNB ID(s) to the serving eNB, the serving eNB determines a list of target eNBs based on at least one of trajectory information for the UE provided by a prior serving eNB, trajectory information for the UE monitored by a current serving eNB, information provided by the UE in the handover request, and load information for the eNB(s) within the candidate set.

The load information for the eNB(s) within the candidate set may be exchanged through the X2 interface.

Furthermore, in the list of target eNBs, the target eNBs may be sequentially arranged according to a specific criterion.

For example, the serving eNB may down-select one or more eNBs from the candidate set.

The specific criterion may include handover priority.

For example, the first eNB of the list of predetermined target eNBs may have the highest priority for handover, the second eNB thereof may have next priority, and the last eNB may have the lowest priority.

Thereafter, the serving eNB initiates a handover procedure along with a selected (or determined) target eNB.

That is, the serving eNB sends a handover request message to the selected target eNB.

Thereafter, if the serving eNB receives a response indicative of the permission of the handover procedure from the selected target eNB, the serving eNB provides the selected target eNB with accumulated trajectory information for the UE.

Thereafter, the serving eNB permits the UE to contact the target eNB for the handover procedure of the UE.

Trajectory information when a serving eNB determines a target eNB (of UE that requests handover) is described in more detail below.

The trajectory information of the UE may be applied to both the method 1 and the method 2.

The trajectory information of the UE means a list of coordinates by which the UE has moved.

Furthermore, the serving eNB may receive the trajectory information of the UE from a prior serving eNB of the UE through the X2 interface.

Alternatively, if the UE has stored offline/stored information on the trajectory through an LTE-Uu interface and/or global positioning satellite (GPS) system, the UE may provide the trajectory information of the UE to the serving eNB.

Providing the trajectory information of the UE by a specific number of prior serving eNBs may be limited due to the limit of resources.

For example, a current serving eNB may have trajectory information for UE, which has been accumulated over three prior serving eNBs.

Furthermore, the serving eNB may receive load information, now being experienced by a candidate set of eNBs, through the ordinary exchange of information between eNBs or through a request for load information from a candidate set of eNBs.

If the load information is requested by the serving eNB, the candidate set of eNBs may provide the load information to the serving eNB.

Methods for performing the handover of a drone using the method 1 and the method 2, respectively, are described in more detail below with reference to related drawings.

FIG. 8 is a flowchart illustrating an example of a handover method in cellular-based drone communication, which is proposed by this specification.

FIG. 8 is a detailed flowchart illustrating the method 1. Reference is made to the description of FIG. 5, for a description of the same steps or procedures as those of FIG. 5.

Referring to FIG. 8, UE measures signal quality of eNBs related to its position where the UE flies.

The measurement of the signal quality may be performed based on an RS transmitted by each of the eNBs.

That is, the measurement of the signal quality may be performed based on reference signal received power (RSRP), reference signal received quality (RSRQ) or the like.

Thereafter, the UE configures a candidate set including candidate eNB(s) based on the measured signal quality.

The candidate set may include only a serving eNB. That is, this may mean that another adjacent eNB other than the serving eNB is not present.

Thereafter, the UE checks whether a difference between the measured signal of the serving eNB and the measured signal of each of the eNBs of the candidate set satisfies a condition defined in Equation 1 below.

$$(P_{(eNBk)} - P_{(eNB1)}) \geq threshold_1$$

In Equation 1, $P_{(eNBk)}$ and $P_{(eNB1)}$ are performance metrics measured for kth eNB and serving eNB, $threshold_1$ indicates the threshold of a specific period interval $\Delta_1$, $eNB_k$ indicates kth eNB belonging to a candidate set ($eNB_k \in$ candidate set), and $eNB_1$ indicates a serving eNB.

If the condition "$(P_{(eNBk)} - P_{(eNB1)}) \geq threshold_1$" is satisfied in Equation 1, the UE triggers a request for handover to the serving eNB and sends the handover request to the serving eNB (S801).

The handover request may include at least one of the candidate set, measured signal quality corresponding to each of the eNB(s) belonging to the candidate set, and the trajectory information of the UE.

In this case, $threshold_1$ and $\Delta_1$ may indicate predetermined values for a handover operation by the serving eNB.

If the serving eNB has the trajectory information of the UE, the UE does not need to provide its trajectory information to the serving eNB.

One or more eNBs may satisfy the condition of Equation 1.

If the condition "$(P_{(eNBk)} - P_{(eNB1)}) \geq threshold_1$" for a specified duration $\Delta_1$ in Equation 1 is not satisfied, the UE stays in a current serving eNB without performing handover.

In this case, the serving eNB that has received the handover request (or message) from the UE because Equation 1 has been satisfied selects a target eNB for handover (S802).

For the selection of the target eNB, reference may be made to the contents described in the method 1 and the method 2.

That is, the serving eNB may select the target eNB based on at least one of information provided by the UE, measured signal quality corresponding to the candidate list of eNBs, trajectory information for the UE which may be used by the serving eNB, and load information for the candidate list of eNBs.

In this case, the target eNB may be determined (or estimated) by assigning a high weight (or score) to an eNB having a better possibility that the UE may move to the corresponding eNB based on the trajectory history of the UE, for example.

Thereafter, the serving eNB sends the handover request of the UE to the target eNB (S803).

Thereafter, the target eNB that has received the handover request sends handover acknowledgement to the serving eNB as a response to the handover request (S804).

Thereafter, the serving eNB provides the UE with information necessary for the UE to contact the target eNB (S805).

For example, the contact may include information for performing non-contention-based random access on the target eNB.

Thereafter, the UE is detached from the serving eNB (S806) and is synchronized with the target eNB (S807).

Prior to step S807, the serving eNB may forward data and trajectory information for the UE to the target eNB.

Thereafter, the UE performs handover to the target eNB.

Thereafter, when handover completion is received from the target eNB, the serving eNB releases resources for the UE including storage information about the trajectory of the UE (S808).

FIG. 9 is a flowchart illustrating another example of a handover method in cellular-based drone communication, which is proposed by this specification.

FIG. 9 is a detailed flowchart illustrating the method 2.

In FIG. 9, reference may be made to the description of FIG. 5 or 8 for a description related to the same steps or procedures as those of FIG. 5 or 8.

First, a serving eNB sends measurement control that instructs UE to measure signal quality (S901). This can be executed regularly or irregularly (e.g., a certain event happened).

The signal quality may be at least one of a signal-to-interference-plus-noise ratio (SINR), a signal-to-noise ratio (SNR), a bit error rate (BER), a frame error rate (FER), reference signal received power (RSRP), reference signal received quality (RSRQ) or the like.

Thereafter, the UE measures signal quality of corresponding eNBs through RSs transmitted by adjacent eNBs, and sends the results of the measurement or a measurement report to the serving eNB (S902).

In this case, the UE configures a candidate set including at least one eNB having the measured signal quality of a specific level or more.

Thereafter, the serving eNB determines whether handover for the UE is necessary based on the signal quality measured by the UE (S903).

In this case, the serving eNB may determine whether handover for the UE is necessary based on Equation 1.

That is, if Equation 1 is satisfied, the serving eNB may determine that handover for the UE is necessary.

If the serving eNB determines that handover for the UE is necessary, it may send handover-related information to the UE.

In this case, the handover-related information may include at least one of the candidate set of eNBs (i.e., eNB IDs), the measured signal quality correspond to each of the candidate set of eNB, and trajectory information for the UE (if possible).

Alternatively, the handover-related information may be included in the results of the measurement of the UE.

Procedures after step S903, that is, procedures of S904 to S909, are the same as the procedures S803 to S808 of FIG. 8.

In another embodiment, a special use case to which the method 1 and the method 2 may be applied is described below.

If the route of UE is previously allocated as information about a series of eNBs on the corresponding route, the UE has only to measure signal quality of a next one of the series of eNBs instead of searching for all of eNBs in order to configure a candidate set.

In some cases, the route of the UE may have been previously determined.

For example, the route of the UE may be a delivery request from a warehouse to a customer house.

If a service provider, such as Amazon, has previously agreed with a mobile network operator (MNO), some of pieces of useful information may be used.

For example, the coordinates of an eNB and the ID of the eNB may be used to determine the delivery route (or route) of UE.

That is, if the UE is capable of using the information (i.e., the coordinates of the eNB and the ID of the eNB) by the reception of the signal from eNB and/or GPS, the UE can determine a target eNB based on the prior information pre-stored in the UE by service provider, e.g., Amazon, on its own route and also simplify the processing of a signal (e.g., a sync signal).

That is, if the coordinates of the eNB and a cell ID are known to the UE, the UE can perform synchronization (primary and secondary synchronization) more simply.

The reason for this is that the UE does not need to perform blind decoding for 504 cell IDs in order to find out the cell ID.

One or more eNBs very close to the route of the UE may be allocated for a redundancy purpose so that the UE can detect a signal (e.g., a sync signal).

For example, if a specific eNB cannot be used in a predetermined route due to the dynamic characteristic of cellular traffic, the UE may contact another eNB that is close to the overloaded specific eNB and that is provided for an extra purpose.

FIG. 10 is a diagram showing an example of a moving method of a drone whose route has been determined, which is proposed by this specification.

From FIG. 10, it may be seen that the route of UE is previously determined to be from a warehouse 1010 to a customer house 1040. It may be seen that the route of the UE ranges via an eNB1, an eNB2, an eNB4, an eNB5, an eNB6, and an eNB7.

From FIG. 10, it may be seen that the eNB2 1020 cannot be used due to a specific factor, such as an overhead situation.

In this case, the UE may access the route through an eNB3 1030 allocated for a redundancy purpose instead of the eNB2.

Accordingly, it may be seen that the route of the UE may range over the eNB1, the eNB3, the eNB4, the eNB5, the eNB6, and the eNB7.

Using the pre-stored information on the route (e.g., the Isit of a series of eNB information) in reverse order, the UE may be returned to the origination place of the delivery, e.g., warehouse operated by Amazon.

When information on the at least one of eNBs on the route with no redundant eNB is not obtainable by the UE on the fly, the UE may be provided a new route information on the fly by the service provider using the MNO network, or UE may be hovered or landed by the command from eNB that is just prior to eNB whose information is not obtainable on the route until the information is available.

In another embodiment, a method for determining, by a central controller, the route of UE and moving, by the UE, along the determined route is described below.

In this method, for example, a central controller determines delivery information and provides it to at least one piece of UE.

The delivery information includes information about the route of the UE.

That is, this method relates to a method for, moving, by the UE, using at least one eNB present in a route based on delivery information provided by a central controller.

The delivery information is information predetermined by the central controller.

Furthermore, the delivery information may include information related to at least one middle eNB present in the route of the UE.

The information related to the middle eNB may include timing information for each eNB and information related to the PBCH transmission of each eNB.

Furthermore, the information related to the middle eNB may include only information about an important eNB in the route of the UE, but may not include information about an eNB of no importance.

Furthermore, the method of FIG. 10 may be performed based on a route provided by a specific operator. Alternatively, in order to optimally determine the route of UE, information related to the route of the UE may be exchanged between operators, and the route of the UE may be optimally determined based on the exchanged information.

Furthermore, if the route of UE is previously determined, there is an advantage in that the UE does not need to perform an unnecessary handover procedure because it has only to perform a handover procedure along with only eNBs within the determined route.

In this case, the UE may skip measurement in a configured measurement gap.

Here, the measurement gap means periods that the UE may use to perform measurements, i.e. no (UL, DL) transmissions are scheduled in the measurement gap.

Furthermore, trajectory information for UE used in this specification may be construed as being a meaning including both prior route information for the UE and future route information for the UE.

FIG. 11 is a flowchart illustrating an example of a method for supporting the handover of a drone, which is proposed by this specification.

FIG. 11 shows an example of a method in which handover is initiated by a drone.

Referring to FIG. 11, the drone measures signal quality of adjacent (or neighboring) eNBs using reference signals (RSs) transmitted by one or more adjacent eNBs (S1110).

In this case, the signal quality may be measured using reference signal received power (RSRP), reference signal received quality (RSRQ) or reference signal strength indication (RSSI).

Thereafter, the drone configures a candidate set, including at least one candidate eNB related to handover, based on the measured signal quality (S1120).

In this case, the signal quality value measured with respect to the at least one candidate eNB is greater than a predetermined threshold.

Thereafter, the drone compares the signal quality of the at least one candidate eNB with the signal quality of a serving eNB (S1130).

If, as a result of the comparison at step S1130, the signal quality of the at least one candidate eNB is found to be better than the signal quality of the serving eNB for a specific period, the drone sends a first message to request handover to the serving eNB (S1140).

In this case, the first message may be called or expressed as a handover request message.

The first message may include at least one of information about the ID of the at least one candidate eNB, signal quality information indicative of the measured signal quality value of the at least one candidate eNB, and trajectory information related to the route of the drone.

The trajectory information may include at least one of past trajectory information indicative of a route along which the drone previously moved and future trajectory information indicative of a route along which the drone will move in the future.

Furthermore, the past trajectory information is provided by a prior serving eNB, and the number of prior serving eNBs that provide the past trajectory information may be limited to a specific number.

Furthermore, the route along which the drone will move in the future may be previously determined. In this case, at least one middle eNB may be included in the route along which the drone will move in the future.

Additionally, the drone may receive information related to the at least one middle eNB from a central controller.

As described above, the central controller may mean an entity which determines the route of the drone and sends control information to the drone.

In this case, the information related to the at least one middle eNB may include at least one of ID information to identify the at least one middle eNB and position information indicative of the position coordinates of the at least one middle eNB.

Procedures after step S1140 are the same as those after the handover request message is transmitted in FIG. 8. For the detailed contents of the procedures, reference may be made to FIG. 8.

FIG. 12 is a flowchart illustrating another example of a method for supporting the handover of a drone, which is proposed by this specification.

FIG. 12 shows an example of a method in which the handover of a drone is initiated by a serving eNB.

Referring to FIG. 12, the serving eNB sends measurement control that instructs the drone to perform measurement (S1210).

Thereafter, the serving eNB receives a measurement report, including a signal quality value for at least one candidate eNB, from the drone (S1220).

In this case, the at least one candidate eNB is included in a candidate set configured by the drone.

Furthermore, the signal quality value for the at least one candidate eNB is greater than a predetermined threshold.

Thereafter, the serving eNB determines whether handover for the drone is necessary based on the received measurement report (S1230).

A method for determining, by the serving eNB, whether handover for the drone is necessary is described in more detail below.

That is, the serving eNB compares its own signal quality value with the signal quality value for the at least one candidate eNB.

Thereafter, the serving eNB determines a target eNB on which the drone may perform handover based on a result of the comparison.

The target eNB may mean a candidate eNB that belongs to the at least one candidate eNB and that has better signal quality than the signal quality of the serving eNB for a specific period.

Additionally, the serving eNB may receive control information related to the handover from the drone.

The control information may include at least one of information about the ID of the at least one candidate eNB, signal quality information indicative of signal quality of the at least one candidate eNB, and trajectory information related to the route of the drone.

Furthermore, in order to determine the target eNB, first, the serving eNB may request load information indicative of the load state of the at least one candidate eNB from the at least one candidate eNB, and may receive a response including the requested load information from the at least one candidate eNB.

Thereafter, the serving eNB may determine the target eNB based on at least one of the received control information or the load information.

In this case, the control information may be included in an S-step measurement report.

Alternatively, if the control information is not included in the measurement report, the serving eNB may send a second message to request the control information, to the drone.

In this case, the second message is transmitted to the drone before the target eNB is determined.

When the target eNB is determined through the aforementioned procedures, the serving eNB sends a handover request message to request handover to the target eNB.

Subsequent procedures are the same as the procedures of FIG. 9 after the handover request message is transmitted. Reference is made to the description of FIG. 9, for the detailed contents of the subsequent procedures.

FIG. 13 is a flowchart illustrating an example of a method for moving a drone along a movement path, which is proposed by this specification.

Referring to FIG. 13, the drone acquires information for a movement path for moving to a specific place (S1310).

Here, the movement path is configured to one or more eNBs.

Thereafter, the drone receives at least one of location coordinate information or identification information for the one or more eNBs (S1320).

Thereafter, the drone checks whether at least one of the location coordinate information or identification information for the one or more eNBs is available (S1330).

Thereafter, the drone moves to the specific place using the movement path if the at least one of the location coordinate information or the identification information is available (S1340).

Also, one or more redundant eNBs can be located at an adjacent location to the movement path.

In this case, the drone changes a specific eNB to a redundant eNB when the specific eNB is not available.

Here, the specific eNB can correspond to one of the one or more eNBs configured to the movement route.

Also, the redundant eNB is an eNB adjacent to the specific eNB.

If the one or more redundant eNBs do not exist and information for any one of the one or more eNBs configured to the movement route is not acquired, the drone updates the movement route, or the drone is hovering at the current location, or the drone lands at a specific point.

For landing at a specific point, the drone can receive a command for indicating landing from the eNB just prior to the any one of the one or more eNBs configured to the movement route.

Also, the movement path can be pre-assigned by a service provider or be determined by a central controller.

As another example proposed in the present specification, a method of supporting movement of a drone between cells in a wireless communication system will be described.

In general, a handover refers to switching communication channel(s) to the moved eNB (or cell) so as to maintain communication when the drone moves out of the serving eNB (or cell) area to another eNB (or cell).

For supporting the handover of the drone, new parameters can be defined, and the handover can be operated based on the new parameters.

First, the drone can receive movement path (or route) information.

The movement path information may be received from a network or may be information already known by the drone.

The network is an entity provided by a service provider or an operator, or is an eNB.

That is, the network corresponds to an entity that transmits the movement path information to the drone.

In addition, the movement path information may include at least one of position (or location) coordinate information for at least one eNB configuring the movement path of the drone, or identification information for the at least one eNB.

Table 1 shows an example of the movement path information.

TABLE 1

| Movement path 1 | eNB 1(x1, y1, z1) -> eNB 3(x3, y3, z3) -> eNB 4(x4, y4, z4) -> eNB 2(x2, y2, z2) |
|---|---|
| Movement path 2 | eNB 4(x4, y4, z4) -> eNB 2(x2, y2, z2) -> eNB 1(x1, y1, z1) -> eNB 3(x3, y3, z3) |
| . . . | . . . |

In Table 1, the eNB 1, the eNB 2, etc. indicate an identifier for identifying the eNBs, and the movement path 1, the movement path 2, etc. are an index indicating the movement path to be assigned to the drone. Also, (xn, yn, zn) represents a position coordinate of a n-th eNB.

In general, in the case of a goods delivery service using the drone, it is preferable that one movement path is set to the drone. However, two or more movement paths may be set to the drone as necessary.

Thereafter, the drone can check whether or not system information is received from each eNB configuring the movement path based on the movement path information during the drone's movement.

The system information can be used only for the drone. So, the system information can be expressed differently from a existing system information.

If the drone receives the system information, the drone may check whether or not the eNB transmitting the system information is an eNB set to the movement path of the drone using the received system information, position information measured through a Global Positioning System (GPS) and the received movement path information.

The drone may include a GPS module for measuring the position information, and the GPS module may be controlled by a processor.

The system information may include at least one of identification information for identifying an eNB such as a cell ID, modification information indicating that the movement path of the drone has been modified (or changed), or information indicating the changed movement path.

Whether or not the movement path is modified can be determined according to a toggle of the modification information.

If the movement path is modified, the drone updates the movement path based on the system information.

Also, the eNB set to the movement path of the drone includes at least one of the eNB included in the movement path information or a redundant (or surplus) eNB located in the periphery of the eNB included in the movement path information.

The redundant eNB means an eNB that replaces the eNB included in the movement path information when the eNB included in the movement path information is not available.

Here, the redundant eNB may be previously mapped to the eNB included in the movement path information.

Here, whether the redundant eNB is preset or not can be determined by receiving information indicating a mapping relationship between a specific eNB and a redundant eNB from the network, or by receiving system information transmitted from the redundant eNB.

If the drone does not receive the system information from the eNB set to the movement path, the drone can hover for a predetermined time until receiving the system information from the specific eNB.

Here, for the sake of convenience of description, it is assumed that the eNB, to which the drone does not receive the system information, is expressed as a 'specific eNB'.

If the system information is a master information block (MIB), the system information may be repeatedly transmitted at a interval of 40 ms.

Alternatively, when the system information is a System Information Block (SIB) 1, the system information may be repeatedly transmitted at a interval of 80 ms.

If the system information is not MIB and SIB 1, the system information may be repeatedly transmitted at a regular interval (or period), and the predetermined period may be scheduled in SIB 1.

Here, a situation where the drone does not receive the system information may be a case where a specific eNB does not operate temporarily, a case that an emergency occurs, or a case that the specific eNB is broken.

Here, if the drone does not receive the system information from the specific eNB even after the hovering (or the predetermined time), the drone may determine that the specific eNB is not available, and the drone may be landed at a specific place.

The system information may be represented by control information, a control message, or the like.

If the drone are not available to the specific eNB but the mapping information related to the redundant eNB is received (or if the redundant eNB is preset in the vicinity of the specific eNB), the drone can receive the system information from the redundant eNB.

Accordingly, the drone moves from the starting point to the target point (or arrival point) through the preceding procedures.

The drone can move through the shortest distance from the starting point to a first eNB configured to the movement path, between the eNBs or from the last eNB configured to the movement path to the destination point.

General Apparatus to which an Embodiment of the Present Invention May be Applied FIG. 14 is a block diagram illustrating a wireless device in which methods as proposed herein may be implemented.

In this case, the wireless device may be a BS, UE, vehicle UE, a network entity, and the network entity includes at least one of eNB-type RSU or MME.

As shown in FIG. 14, the network entity 1410 and the UE (or the vehicle UE) 1420 include communication units (transmitting/receiving units, RF units, 1413 and 1423), processors 1411 and 1421, and memories 1412 and 1422.

The network entity and the UE may further input units and output units.

The communication units 1413 and 1423, the processors 1411 and 1421, the input units, the output units, and the memories 1412 and 1422 are operatively connected with each other in order to conduct the methods as proposed herein.

The communication units (transmitting/receiving units or RF units, 1413 and 1423), when receiving information created from a Physical Layer (PHY) protocol, transfer the received information through Radio Frequency (RF) spectrums and conduct filtering and amplification, then transmit the results through antennas.

Furthermore, the communication units transfer Radio Frequency (RF) signals received through the antennas to bands capable of being processed by the PHY protocol, and perform filtering.

However, the communication units may also include the functions of switches to switch transmitting and receiving functions.

The processors 1411 and 1421 implement functions, procedures, and/or methods as proposed herein. The layers of radio interface protocols may be implemented by the processors.

The processors may be represented as control parts, controllers, control units, or computers.

The memories 1412 and 1422 are connected with the processors to store protocols or parameters for tracking a location vehicle UE.

The processor may include an application-specific integrated circuit (ASIC), a separate chipset, a logic circuit, and/or a data processing unit. The memory may include read-only memory (ROM), random access memory (RAM), flash memory, memory cards, storage media and/or other equivalent storage devices. The RF unit may include a base-band circuit for processing a radio signal. When the embodiment of the present invention is implemented in software, the aforementioned methods may be implemented with a module (or a process or a function) for performing the aforementioned functions. The module may be stored in the memory and may be performed by the processor. The memory may be located inside or outside the processor, and may be coupled to the processor by using various well-known means.)

The output unit (display unit) is controlled by the processor and outputs information from the process, together with various information signals from the processor and key input signals generated from the key input unit.

Furthermore, although the drawings have been individually described for ease of description, the embodiments shown in the drawings may be merged with each other to implement new embodiments. As necessary by one of ordinary skill, designing recording media readably by a computer recording programs to execute the above-described embodiments also belongs to the scope of the present invention.

Meanwhile, the tracking a location procedure as described herein may be implemented as processor-readable codes in a recording medium that may be read by a processor provided in a network device.

The process readable recording media include all types of recording devices storing data that is readable by the processor. Examples of the recording media readable by the process include ROMs, RAMs, CD-ROMs, magnetic tapes, floppy discs, optical data storage devices, etc., and may be further implemented in the form of carrier waves such as transmitted over the Internet.

Furthermore, the recording media readable by the processor may be distributed to computer systems connected with each other via a network, and processor readable codes may be stored and executed in a distributing manner.

This disclosure lies in handover procedure of a drone in a wireless communication system.

INDUSTRIAL APPLICABILITY

Examples in which the method for support handover of a drone in a wireless communication system according to an embodiment of the present invention has been applied to 3GPP LTE/LTE-A systems have been described, but the method may be applied to various wireless communication systems in addition to the 3GPP LTE/LTE-A systems.

The invention claimed is:

1. A method for supporting a handover of a drone in a wireless communication system, the method being performed by the drone and comprising:
measuring signal quality of a plurality of eNBs using a reference signal (RS) transmitted by each of the plurality of eNBs;
selecting at least one candidate eNB from the plurality of eNBs based on the measured signal quality,
wherein a candidate set related to the handover comprises the at least one candidate eNB;
comparing a threshold value with a difference value between a first signal quality value measured for each candidate eNB in the candidate set and a second signal quality value measured for a serving eNB; and
transmitting, to the serving eNB, a first message to request the handover based on the difference value being greater than the threshold value during a specific period,
wherein the first message comprises (i) identification information indicating an identifier (ID) of the at least one candidate eNB, (ii) signal quality information indicating the signal quality value measured for the at least one candidate eNB, and (iii) trajectory information related to a route of the drone.

2. The method of claim 1, wherein the signal quality comprises reference signal received power (RSRP), reference signal received quality (RSRQ) or reference signal strength indication (RSSI).

3. The method of claim 1, wherein the trajectory information comprises past trajectory information indicating a route along which the drone previously moved and future trajectory information indicating a route along which the drone is to move in the future.

4. The method of claim 3, wherein the route along which the drone is to move in the future is previously determined, and at least one middle eNB is included in the route along which the drone is to move in the future.

5. The method of claim 4, further comprising:
receiving information related to the at least one middle eNB from a central controller, wherein the information related to the at least one middle eNB comprises identification (ID) information to identify the at least one middle eNB and position information indicating position coordinates of the at least one middle eNB.

6. The method of claim 1, further comprising:
receiving, from the serving eNB, information for contact between the drone and a target eNB, wherein the target eNB is selected from the candidate set.

7. The method of claim 6, wherein the target eNB is selected
based on the signal quality information and the trajectory information.

8. A drone performing handover in a wireless communication system, the drone comprising:
a transmitter and receiver for transmitting and receiving a radio signal; and
a processor functionally connected to the transmitter and receiver,
wherein the processor is configured to:
measure signal quality of a plurality of eNBs using a reference signal (RS) transmitted by each of the plurality of eNBs;
select at least one candidate eNB from the plurality of eNBs based on the measured signal quality,
wherein a candidate set related to the handover comprises the at least one candidate eNB;
compare a threshold value with a difference value between a first signal quality value measured for each candidate eNB in the candidate set and a second signal quality value measured for a serving eNB; and
transmit, to the serving eNB, a first message to request the handover based on the difference value being greater than the threshold value during a specific period,
wherein the first message comprises (i) identification information indicating an identifier (ID) of the at least one candidate eNB, (ii) signal quality information indicating the value of signal quality measured for the at least one candidate eNB, and (iii) trajectory information related to a route of the drone.

* * * * *